United States Patent [19]

Nonomura et al.

[11] Patent Number: 5,796,435
[45] Date of Patent: Aug. 18, 1998

[54] IMAGE CODING SYSTEM WITH ADAPTIVE SPATIAL FREQUENCY AND QUANTIZATION STEP AND METHOD THEREOF

[75] Inventors: Itaru Nonomura, Nerima-ku; Shinichi Hashimoto, Hadano; Yuuji Kimura, Yokohama; Takahiro Yamada, Yokohama; Kazuaki Tanaka, Yokohama, all of Japan

[73] Assignee: Hitachi, Ltd., Tokyo, Japan

[21] Appl. No.: 607,156

[22] Filed: Feb. 26, 1996

[30] Foreign Application Priority Data

Mar. 1, 1995 [JP] Japan .................. 7-041592

[51] Int. Cl.$^6$ .................................. H04N 7/32
[52] U.S. Cl. .................. 348/405; 348/416
[58] Field of Search .................. 348/384, 390, 348/400–405, 407, 409–413, 415, 416, 420, 423, 699; 382/232, 236, 238, 248, 250, 251; H04N 7/133, 7/137

[56] References Cited

U.S. PATENT DOCUMENTS

| | | | |
|---|---|---|---|
| 5,046,121 | 9/1991 | Yonekawa et al. | 382/250 |
| 5,063,608 | 11/1991 | Siegel | 348/405 |
| 5,107,345 | 4/1992 | Lee | 348/403 |
| 5,196,933 | 3/1993 | Henot | 348/420 |
| 5,227,877 | 7/1993 | Yukitake | 348/416 |
| 5,440,345 | 8/1995 | Shimoda | 348/402 |
| 5,473,380 | 12/1995 | Tahara | 348/423 |
| 5,510,840 | 4/1996 | Yonemitsu et al. | 348/416 |

*Primary Examiner*—Richard Lee
*Attorney, Agent, or Firm*—Fay Sharpe Beall; Fagan Minnich & McKee

[57] ABSTRACT

An image coding system and method thereof previously defines a plurality of combinations into a table. The table includes candidate values for quantizing steps and candidate values for upper limit values of space frequencies in correspondence with an image code size. The frequencies are coded into the pattern table on the basis of an error between the required code size, which is decided by the system performance, and required images. The generated code size is taken at the time of prediction coding between motion compensation frames. One combination of a quantizing step and upper limit values of space frequency are selected. The combination is coded from the candidate values depending on the image attribute and codes conforming to an international standard. The combinations are generated at a satisfactory coding efficiency. The coding efficiency is achieved by controlling the coding parameters depending on the image attribute and generated code size.

21 Claims, 15 Drawing Sheets

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

| QUANTIZING STEP | | UPPER LIMIT FREQUENCY | |
|---|---|---|---|
| Q1 | Q2 | F1 | F2 |
| 62 | 62 | 1 | 1 |
| 62 | 62 | 3 | 3 |
| 62 | 62 | 6 | 6 |
| 62 | 60 | 10 | 6 |
| 62 | 56 | 15 | 6 |
| 62 | 52 | 21 | 6 |
| 62 | 48 | 28 | 6 |
| 62 | 44 | 44 | 6 |
| 62 | 40 | 64 | 6 |
| 60 | 36 | 64 | 6 |
| 56 | 32 | 64 | 6 |
| 52 | 28 | 64 | 6 |
| 48 | 24 | 64 | 6 |
| 44 | 20 | 64 | 6 |
| 40 | 16 | 64 | 6 |
| 36 | 12 | 64 | 6 |
| 32 | 10 | 64 | 6 |
| 28 | 8 | 64 | 6 |
| 24 | 6 | 64 | 6 |
| 20 | 4 | 64 | 6 |
| 16 | 2 | 64 | 6 |
| 12 | 2 | 64 | 10 |
| 10 | 2 | 64 | 15 |
| 8 | 2 | 64 | 21 |
| 6 | 2 | 64 | 28 |
| 4 | 2 | 64 | 44 |
| 2 | 2 | 64 | 64 |

| 37 | 36 | 49 | 71 | 80 | 82 | 88 | 103 |
|----|----|----|----|----|----|----|-----|
| 38 | 45 | 82 | 88 | 100 | 120 | 139 | 157 |
| 45 | 77 | 86 | 100 | 107 | 120 | 139 | 190 |
| 77 | 86 | 85 | 98 | 101 | 160 | 190 | 193 |
| 70 | 80 | 50 | 100 | 147 | 172 | 190 | 198 |
| 70 | 66 | 55 | 57 | 157 | 190 | 200 | 198 |
| 69 | 65 | 66 | 25 | 25 | 195 | 199 | 195 |
| 69 | 68 | 63 | 25 | 25 | 199 | 195 | 193 |

FIG. 15b

| 1 | 13 | 22 | 9 | 2 | 6 | 15 |
|---|----|----|---|---|---|-----|
| 7 | 27 | 6 | 12 | 20 | 19 | 18 |
| 28 | 9 | 14 | 7 | 13 | 19 | 51 |
| 9 | 1 | 13 | 3 | 59 | 30 | 3 |
| 10 | 30 | 50 | 47 | 25 | 18 | 8 |
| 4 | 11 | 2 | 100 | 33 | 10 | 2 |
| 4 | 1 | 41 | 0 | 170 | 4 | 4 |
| 1 | 5 | 38 | 0 | 174 | 4 | 2 |

IMAGE CODING SYSTEM WITH ADAPTIVE SPATIAL FREQUENCY AND QUANTIZATION STEP AND METHOD THEREOF

BACKGROUND OF THE INVENTION

The present invention relates to an image coding system and a method thereof and particularly to a moving picture transmission system including a moving picture encoder for compressing moving picture data used in a TV telephone apparatus, a TV conference device, a video mail apparatus, and others and transforming it to code data and transmitting it via a communication line and a method thereof.

DESCRIPTION OF THE PRIOR ART

Since moving picture data is very large in size, it is compressed when it is stored or transmitted so as to reduce the storage capacity of a memory means which is necessary for storage and to shorten the time necessary for transmission. There are international standards for compressing moving picture data available such as the MPEG1 (Moving Picture Experts Group phase 1) standard standardized by ISO and the H.261 standard standardized by CCITT (ITU-T at present) and these international standards are widely used at present.

Next, the principles of the data compression systems on the basis of the international standards will be explained briefly. Each of the data compression systems is an orthogonal transform system using orthogonal transform. This orthogonal transform system is a system for coding by using a trend that when image data is transformed orthogonally to an orthogonal transform coefficient, the coefficient corresponding to a low space frequency increases and the coefficient corresponding to a high space frequency decreases and a fact that the visual sense of a human is sharp to a low space frequency and dull to a high space frequency.

Next, the system for generating a code based on the aforementioned MPEG1 standard will be explained briefly with reference to FIG. 1. Namely, the system for generating a code based on the MPEG1 standard divides input image data into blocks of 8 pixels×8 pixels by a block dividing means 101 and supplies them to a motion compensation prediction means 102 in the aforementioned orthogonal transform system. The motion compensation prediction means 102 generates macro blocks by integrating four brightness blocks and two chrominance blocks which are supplied from the block dividing means 101, performs operations between the macro blocks and decoded image data stored in the frame memory, generates a motion vector for each macro block, generates a difference block for each macro block, and supplies the difference block to an orthogonal transform means 103 and the motion vector to a code outputting means 106 and an inverse orthogonal transform means 108. The orthogonal transform means 103 obtains a DCT coefficient by executing discrete cosine transform (hereinafter abbreviated to DCT) which is a kind of orthogonal transform for the difference blocks supplied from the motion compensation prediction means 102 and supplies the DCT coefficient to a quantizing means 104. The quantizing means 104 divides the DCT coefficient supplied from the orthogonal transform means 103 by a numerical value obtained by multiplying the quantizing step by the corresponding component of the quantization matrix or by a fixed value and supplies the obtained quantization coefficient to a variable length coding means 105. The variable length coding means 105 transforms the quantization coefficient supplied from the quantizing means 104 to a variable length code and supplies the variable length code to the code outputting means 106. The code outputting means 106 obtains image code data by adding the control information used for decoding to the variable length supplied from the variable length coding means 105 and the motion vector supplied from the motion compensation prediction means 102 and outputs the image code data to the outside. An inverse quantizing means 107 obtains an inverse quantization coefficient by inversely quantizing the quantization coefficient supplied from the quantizing means 104 and supplies the inverse quantization coefficient to an inverse orthogonal transform means 108. The inverse orthogonal transform means 108 obtains an inverse orthogonal transform coefficient by executing inverse orthogonal transform for the inverse quantization coefficient supplied from the inverse quantizing means 107, generates decoded image data used for motion compensation prediction at the time of coding the next frame by adding the inverse orthogonal transform coefficient and decoded image data stored in a frame memory 109, and stores the decoded image data in the frame memory 109. The decoded image data used for addition is decided on the basis of the motion vector supplied from the motion compensation prediction means 102. By the aforementioned procedure, a code based on the MPEG1 standard can be generated.

Furthermore, the system for generating a code based on the aforementioned H.261 standard will be explained briefly with reference to FIG. 1. Namely, the system for generating a code based on the H.261 standard divides input image data into blocks of 8 pixels×8 pixels by the block dividing means 101 and supplies the blocks to the motion compensation prediction means 102 in the aforementioned orthogonal transform system. The motion compensation prediction means 102 generates macro blocks by integrating four brightness blocks and two chrominance blocks which are supplied from the block dividing means 101, performs operations between the macro blocks and decoded image data stored in the frame memory, generates a motion vector for each macro block, generates a difference block for each macro block, and supplies the difference block to the orthogonal transform means 103 and the motion vector to the code outputting means 106 and the inverse orthogonal transform means 108. The orthogonal transform means 103 obtains a DCT coefficient by executing DCT for the difference blocks supplied from the motion compensation prediction means 102 and supplies the DCT coefficient to the quantizing means 104. The quantizing means 104 divides the DCT coefficient supplied from the orthogonal transform means 103 by the quantizing step or a fixed value and supplies the obtained quantization coefficient to the variable length coding means 105. The variable length coding means 105 transforms the quantization coefficient supplied from the quantizing means 104 to a variable length code and supplies the variable length code to the code outputting means 106. The code outputting means 106 obtains image code data by adding the control information used for decoding to the variable length supplied from the variable length coding means 105 and the motion vector supplied from the motion compensation prediction means 102 and outputs the image code data to the outside. The inverse quantizing means 107 obtains an inverse quantization coefficient by inversely quantizing the quantization coefficient supplied from the quantizing means 104 and supplies the inverse quantization coefficient to the inverse orthogonal transform means 108. The inverse orthogonal transform means 108 obtains an inverse orthogonal transform coefficient by executing inverse orthogonal transform for the inverse quantization coefficient supplied from the inverse quantizing means 107, generates decoded image data used for motion compensation prediction at the time of coding the next frame by adding the inverse orthogonal transform coefficient and decoded image data stored in the frame memory 109, and stores the decoded image data in the frame memory 109. The decoded image data used for addition is decided on the basis of the motion vector supplied from the motion compensation prediction means 102. By the aforementioned procedure, a code based on the H.261 standard can be generated.

It is generally known that moving picture data can be compressed efficiently by these methods.

However, a problem arises that if data is quantized by the same characteristic regardless of the image attribute, when an image including a sudden gradation change is coded, noise or diffusion which is visually conscious of is seen in an image obtained by decoding a code, caused by that the orthogonal transform coefficient corresponding to a high space frequency is roughly quantized. Another problem arises that in an image having little gradation change inversely, a blockish strain or an outline which does not exist originally is seen in an image obtained by decoding a code, caused by that the visual sense of a human is sharp to a low space frequency.

Control of the generated code size is important in coding of an image. When the generated code size is too large, it is not desirable because the communication cost is increased due to an increase in the transmission time when code data is transmitted via a communication line and the cost of the memory means is increased due to an increase in the necessary storage capacity when code data is stored in the memory means and when the generated code size is too small, it is also undesirable because degradation of the image quality is caused.

To solve these problems, as a first prior art, as described in Japanese Patent Application Laid-Open 4-170283, it is known that the content of an image is estimated on the basis of blocked image data and the quantizing step and the upper limit value of the space frequency to be coded are changed on the basis of the estimation result and as a second prior art, as described in Japanese Patent Application Laid-Open 5-276503, it is known that the generated code size is controlled by controlling the quantizing step on the basis of the occupant amount of the code buffer in which code data is stored and the image data of the difference block.

In the aforementioned first prior art, data can be coded depending on the image attribute, though there is a problem imposed that the generated code size is not taken into account.

In the aforementioned second prior art, there is a problem imposed that it is difficult to always obtain the best image quality because the generated code size is controlled only by changing the quantizing step.

SUMMARY OF THE INVENTION

An object of the present invention is to eliminate the difficulties of the prior arts mentioned above and to provide a moving picture image encoder, a moving picture transmitter, a system thereof, and a method thereof which can express a sudden gradation change for an image including a sudden gradation change under the condition that an image is coded in a code size close to a required code size inputted from the outside, minimize occurrence of a block strain or a false outline for an image having little gradation change, and generate code data on the basis of the international standard.

Another object of the present invention is to provide a moving picture transmitter, a TV conference device, and a method thereof which can express a sudden gradation change for an image including a sudden gradation change under the condition that an image is coded in a code size close to a required code size which is decided by a required image of an opposite terminal and performance thereof, minimize occurrence of a block strain or a false outline for an image having little gradation change, and transmit code data on the basis of the international standard to the opposite terminal via a communication network.

To accomplish these objects, the present invention is an image coding system of a system including an image inputting means, an image coding means, and an image code transmitting means and a method thereof, wherein the system has parameter information having a plurality of combinations of quantizing steps and upper limit values of image space frequencies depending on the image code size and decides one combination from the parameter information on the basis of the image code size which is coded by the coding means, does not execute quantization corresponding to space frequencies exceeding the upper limit value of the image space frequencies of the decided combination practically, and quantizes the orthogonal transform coefficient for space frequencies below the upper limit values of image space frequencies on the basis of the quantizing step of the decided combination.

Furthermore, the system executes motion compensation prediction for the image data inputted from the image inputting means, obtains an orthogonal transform coefficient by executing orthogonal transform for a difference block generated by the motion compensation prediction, decides a plurality of combinations from the parameter information on the basis of the image code size which is coded by the orthogonal transform coefficient, estimates the image attribute on the basis of at least one of the difference block and the orthogonal transform coefficient, selects a combination of the desired one quantizing step and upper limit value of space frequency from the decided plurality of combinations depending on the estimated image attribute, does not execute quantization corresponding to a space frequency exceeding the upper limit value of the image space frequencies of the selected combination practically, and quantizes the orthogonal transform coefficient for a space frequency less than the upper limit values of image space frequencies on the basis of the quantizing step of the decided combination.

These are summarized more concretely as indicated below. The present invention is a moving picture encoder comprising a parameter table having a plurality of combinations of quantizing steps and upper limit values of image space frequencies depending on the image code size and a calculation means for deciding a combination of a quantizing step and an upper limit value of space frequency from the parameter table according to the relation between the required code size and the coded image code size, executing a quantization process for an orthogonal transform coefficient less than the decided upper limit value of space frequency or corresponding to a space frequency lower than the upper limit value on the basis of the decided quantizing step when a quantization coefficient is obtained by quantizing an orthogonal transform coefficient, and obtaining a quantization coefficient by setting the orthogonal transform coefficient more than the decided upper limit value of space frequency or corresponding to a space frequency more than the upper limit value to zero practically.

The present invention is a moving picture encoder comprising an image data inputting means for inputting image data, a storage means for registering a parameter table having a plurality of combinations of quantizing steps and upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding a combination of a quantizing step and an upper limit value of space frequency from the parameter table according to the relation between the required code size and the coded image code size, executing a quantization process for the orthogonal transform coefficient less than the decided upper limit value of space frequency or corresponding to a space frequency lower than the upper limit value on the basis of the decided quantizing step, obtaining a quantization coefficient by setting the orthogonal transform coefficient more than the decided upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the decided quantizing step.

The present invention is a moving picture transmitter comprising a moving picture coding means having an image data inputting means for inputting image data, a storage means for registering a parameter table having a plurality of combinations of quantizing steps and upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding a combination of a quantizing step and an upper limit value of space frequency from the parameter table according to the relation between the required code size of an opposite terminal and the coded image code size, executing a quantization process for the orthogonal transform coefficient less than the decided upper limit value of space frequency or corresponding to a space frequency lower than the upper limit value on the basis of the decided quantizing step, obtaining a quantization coefficient by setting the orthogonal transform coefficient more than the decided upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the decided quantizing step, a storage means for storing the image code data generated by the moving picture coding means, and a transmission calculation means for transmitting the image code data stored in the storage means to an opposite terminal via a communication network.

The present invention is a TV conference device comprising a moving picture coding means having an image data inputting means for inputting image data, a storage means for registering a parameter table having a plurality of combinations of quantizing steps and upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding a combination of a quantizing step and an upper limit value of space frequency from the parameter table according to the relation between the required code size and the coded image code size, executing a quantization process for the orthogonal transform coefficient less than the decided upper limit value of space frequency or corresponding to a space frequency lower than the upper limit value on the basis of the decided quantizing step, obtaining a quantization coefficient by setting the orthogonal transform coefficient more than the decided upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the decided quantizing step, a storage means for storing image code data generated by the moving picture coding means and storing image code data transmitted from an opposite terminal, a display means for displaying decoded image data, and a transmission calculation means for transmitting the image code data stored in the storage means to the opposite terminal via a communication network and decoding and displaying the image code data which is transmitted from the opposite terminal and stored in the storage means on the display means.

The present invention is a moving picture encoder comprising an image data inputting means for inputting image data, a storage means for registering a parameter table having a plurality of combinations of a plurality of quantizing steps and a plurality of upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding combinations of a plurality of quantizing steps and a plurality of upper limit values of space frequencies from the parameter table according to the relation between the required code size and the coded image code size, estimating the image attribute on the basis of the difference block or the orthogonal transform coefficient, selecting the desired quantizing step and the desired upper limit value of space frequency from the decided plurality of combinations depending on the estimated image attribute, executing a quantization process for the orthogonal transform coefficient less than the selected desired upper limit value of space frequency or corresponding to a space frequency lower than the upper limit value on the basis of the decided quantizing step, obtaining a quantization coefficient by setting the orthogonal transform coefficient more than the selected desired upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the selected quantizing step.

The present invention is a moving picture transmitter comprising a moving picture coding means having an image data inputting means for inputting image data, a storage means for registering a parameter table having a plurality of combinations of a plurality of quantizing steps and a plurality of upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding combinations of a plurality of quantizing steps and a plurality of upper limit values of space frequencies from the parameter table according to the relation between the required code size and the coded image code size, estimating the image attribute on the basis of the difference block or the orthogonal transform coefficient, selecting the desired quantizing step and the desired upper limit value of space frequency from the decided plurality of combinations depending on the estimated image attribute, executing a quantization process for the orthogonal transform coefficient less than the selected desired upper limit value of space frequency or corresponding to a space frequency lower than the upper limit value on the basis of the decided quantizing step, obtaining a quantization coefficient by setting the orthogonal transform coefficient more than the selected desired upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the selected quantizing step, a storage means for storing the image code data generated by the moving picture coding means, and a transmission calculation means for transmitting the image code data stored in the storage means to an opposite terminal via a communication network.

The present invention is a TV conference device comprising a moving picture coding means having an image data inputting means for inputting image data, a storage means for registering a parameter table having a plurality of combinations of a plurality of quantizing steps and a plurality of upper limit values of image space frequencies depending on the image code size beforehand, and a calculation means for executing motion compensation prediction for the image data inputted from the image inputting means, obtaining an orthogonal transform coefficient by executing orthogonal transform for a difference block generated by the motion compensation prediction, deciding combinations of a plurality of quantizing steps and a plurality of upper limit values of space frequencies from the parameter table according to the relation between the required code size and the coded image code size, estimating the image attribute on the basis of the difference block or the orthogonal transform coefficient, selecting the desired quantizing step and the desired upper limit value of space frequency from the decided plurality of combinations depending on the estimated image attribute, executing a quantization process for the orthogonal transform coefficient less than the selected desired upper limit value of space frequency or corresponding to a space frequency lower than the upper limit value on the basis of the decided quantizing step, obtaining a quantization coefficient by setting the orthogonal transform coefficient more than the selected desired upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the selected quantizing step, a storage means for storing image code data generated by the moving picture coding means and storing image code data transmitted from an opposite terminal, a display means for displaying decoded image data, and a transmission calculation means for transmitting the image code data stored in the storage means to the opposite terminal via a communication network and decoding and displaying the image code data which is transmitted from the opposite terminal and stored in the storage means on the display means.

The present invention is a moving picture encoder comprising a calculation means for generating macro blocks by dividing input image data into blocks of n pixels×n pixels and integrating a plurality of blocks, generating a motion vector for each macro block by performing operations between the macro blocks and decoded image data stored in the frame memory, executing motion compensation prediction by generating a difference block for each divided macro block, obtaining an orthogonal transform coefficient by executing orthogonal transform for each difference block, selecting each of the desired quantizing step and the desired upper limit value of space frequency from combinations of candidate values of a plurality of quantizing steps and candidate values of a plurality of upper limit values of space frequencies which are decided on the basis of the predetermined function or the preregistered pattern table from the image code size and required code size depending on the image attribute which is estimated on the basis of the difference block or orthogonal transform coefficient, quantizing the orthogonal transform coefficient less than the selected desired upper limit value of space frequency or corresponding to a space frequency lower than the upper limit value using the selected quantizing step, obtaining a quantization coefficient by setting the orthogonal transform coefficient more than the selected upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the selected quantizing step.

The present invention is a moving picture encoder comprising a calculation means for generating macro blocks by dividing input image data into blocks of n pixels×n pixels and integrating a plurality of blocks, generating a motion vector for each macro block by performing operations between the macro blocks and decoded image data stored in the frame memory, executing motion compensation prediction by generating a difference block for each divided macro block, obtaining an orthogonal transform coefficient by executing orthogonal transform for each difference block, selecting each of the desired quantizing step and the desired upper limit value of space frequency from combinations of candidate values of a plurality of quantizing steps and candidate values of a plurality of upper limit values of space frequencies which are decided on the basis of the predetermined function or the preregistered pattern table from the image code size and required code size depending on whether it is an image including a sudden gradation change or an image having little gradation change which is estimated on the basis of the difference block or orthogonal transform coefficient, quantizing the orthogonal transform coefficient less than the selected desired upper limit value of space frequency or corresponding to a space frequency lower than the upper limit value using the selected quantizing step, obtaining a quantization coefficient by setting the orthogonal transform coefficient more than the selected upper limit value of space frequency or corresponding to a space frequency more than the upper limit value to zero practically, transforming a quantization coefficient obtained when the space frequency is less than the upper limit value to a variable length code, and generating image code data by adding the control information necessary for decoding to the transformed variable length code and the selected quantizing step.

According to the present invention, the calculation means of the moving picture encoder is structured so as to select a step of a large value for the aforementioned desired quantizing step from candidate values of a plurality of quantizing steps and select an upper limit value of a large value for the aforementioned desired upper limit value of space frequency from candidate values of a plurality of upper limit values of space frequencies to be coded when it is estimated as an image including a sudden gradation change and to select a step of a small value for the aforementioned desired quantizing step from candidate values of a plurality of quantizing steps and select an upper limit value of a small value for the aforementioned desired upper limit value of space frequency from candidate values of a plurality of upper limit values of space frequencies to be coded when it is estimated as an image having little gradation change.

According to the present invention, the calculation means of the moving picture encoder is structured so as to obtain the predetermined function or preregistered parameter table on the basis of a plurality of moving pictures having different gradation changing degrees.

The present invention is a moving picture transmitter comprising the aforementioned moving picture encoder and a means for autonomously detecting the load of a network or the processing capacity and processing load of a terminal having the moving picture encoder and deciding the aforementioned required code size to be supplied to a computer installed in the moving picture encoder on the basis of the detection result thereof.

The present invention is a moving picture transmitter comprising the aforementioned moving picture encoder and a means for deciding the aforementioned required code size to be supplied to a computer installed in the moving picture encoder on the basis of the processing capacity and the required value of code size of an opposite terminal executing image communication.

The present invention is a moving picture transmitter comprising the aforementioned moving picture encoder and a means for deciding the aforementioned required code size to be supplied to a computer installed in the moving picture encoder on the basis of an operation of a user using the moving picture transmitter.

The present invention comprises a first block dividing means for dividing input image data into blocks of n pixels×n pixels, a motion compensation prediction means for generating macro blocks by integrating a plurality of blocks divided by the block dividing means, generating a motion vector for each macro block by performing operations between the macro blocks and decoded image data stored in the frame memory, and generating a difference block for each block, a first orthogonal transform means for obtaining an orthogonal transform coefficient by executing orthogonal transform for each difference block, a first image attribute estimation means for estimating the image attribute from the orthogonal transform coefficient, selecting a step of a small value from candidate values of a plurality of quantizing steps supplied from the first code size judgment means and selecting an upper limit value of a small value from candidate values of a plurality of upper limit values of space frequencies to be coded which are supplied from the first code size judgment means when it is estimated as an image including a sudden gradation change, and selecting a step of a large value from candidate values of a plurality of quantizing steps supplied from the first code size judgment means and selecting an upper limit value of a large value from candidate values of a plurality of upper limit values of space frequencies to be coded which are supplied from the first code size judgment means when it is estimated as an image having little gradation change, a first quantizing means for quantizing the orthogonal transform coefficient which is selected by the image attribute estimation means and corresponds to a space frequency lower than the upper limit value of space frequency to be coded using the quantizing step selected by the image attribute estimation means and obtaining a quantization coefficient by setting the orthogonal transform coefficient which is selected by the image attribute estimation means and corresponds to a space frequency higher than the upper limit value of space frequency to be coded to zero, a first variable length coding means for transforming the quantization coefficient which is selected by the image attribute estimation means and corresponds to a space frequency lower than the upper limit value of space frequency to be coded to a variable length code, a first code outputting means for outputting code data by adding the control information necessary for decoding to the variable length code and quantizing step, a first code size measurement means for measuring the size of code data outputted by the code outputting means, a first code size judgment means for deciding candidate values of a plurality of quantizing steps and candidate values of upper limit values of space frequencies to be coded respectively from measured values of code size obtained from the code size measurement means and the required values of code sizes supplied from the outside and supplying the candidate values to the image attribute judgment means, a first inverse quantizing means for obtaining an inverse quantization coefficient by quantizing an inverse quantization coefficient obtained by the quantizing means, and a first inverse orthogonal transform means for obtaining an inverse orthogonal transform coefficient by executing inverse orthogonal transform for the inverse quantization coefficient obtained by the inverse quantizing means, generating new decoded image data by adding the inverse orthogonal transform coefficient and decoded image data stored in the frame memory, and storing the decoded image data in the frame memory.

The present invention comprises a second block dividing means for dividing input image data into blocks of n pixels×n pixels, a second motion compensation prediction means for generating macro blocks by integrating a plurality of blocks divided by the block dividing means, generating a motion vector for each macro block by performing operations between the macro blocks and decoded image data stored in the frame memory, and generating a difference block for each block, a second image attribute estimation means for estimating the image attribute from the image data of the difference block, selecting a step of a small value from candidate values of a plurality of quantizing steps supplied from the second code size judgment means and selecting an upper limit value of a small value from candidate values of a plurality of upper limit values of space frequencies to be coded which are supplied from the second code size judgment means when it is estimated as an image including a sudden gradation change, and selecting a step of a large value from candidate values of a plurality of quantizing steps supplied from the second code size judgment means and selecting an upper limit value of a large value from candidate values of a plurality of upper limit values of space frequencies to be coded which are supplied from the second code size judgment means when it is estimated as an image having little gradation change, a second orthogonal transform means for obtaining an orthogonal transform coefficient by executing orthogonal transform for each difference block, obtaining the orthogonal transform coefficient which is selected by the image attribute estimation means and corresponds to a space frequency lower than the upper limit value of space frequency to be coded and obtaining an orthogonal transform coefficient by setting the orthogonal transform coefficient which is selected by the image attribute estimation means and corresponds to a space frequency higher than the upper limit value of space frequency to be coded to zero, a second quantizing means for obtaining a quantization coefficient by quantizing the orthogonal transform coefficient which is selected by the image attribute estimation means and corresponds to a space frequency lower than the upper limit value of space frequency to be coded using the quantizing step decided by the image attribute estimation means, a second variable length coding means for transforming the quantization coefficient which is selected by the image attribute estimation means and corresponds to a space frequency lower than the upper limit value of space frequency to be coded to a variable length code, a second code outputting means for outputting code data by adding the control information necessary for decoding to the variable length code and quantizing step, a second code size measurement means for measuring the size of code data outputted by the code outputting means, a second code size judgment means for deciding candidate values of a plurality of quantizing steps and candidate values of upper limit values of space frequencies to be coded respectively from measured values of code size obtained from the code size measurement means and the required values of code sizes supplied from the outside and supplying the candidate values to the image attribute judgment means, a second inverse quantizing means for obtaining an inverse quantization coefficient by inversely quantizing a quantization coefficient, and a second inverse orthogonal transform means for generating an inverse orthogonal transform coefficient by executing inverse orthogonal transform for the inverse quantization coefficient, generating new decoded image data by adding the inverse orthogonal transform coefficient and decoded image data stored in the frame memory, and storing the decoded image data in the frame memory.

The present invention having the aforementioned constitution has the function and operation indicated below.

A new and superior moving picture encoder, moving picture transmitter, TV conference device, and systems thereof can be realized, wherein each apparatus inputs a required code size from the outside, estimates the content of an image in each area on the screen comprising one or a plurality of macro blocks, can express a sudden gradation change by increasing the upper limit value of space frequencies to be coded for an image including a sudden gradation change under the condition of coding in an image code size close to the required code size by setting a quantizing step and an upper limit value of space frequency to be coded on the basis of the estimated result and required code size, can suppress an occurrence of a block strain or false outline by finely quantizing an image having little gradation change, and can generate an image code on the basis of the inter-national standard for image coding. Namely, by preparing a parameter table having a plurality of quantizing steps and upper limit values of space frequencies depending on the image code size, a new and superior moving picture encoder, moving picture transmitter, TV conference device, and systems thereof can be realized.

The foregoing and other objects, advantages, manner or operation and novel features of the present invention will be understood from the following detailed description when read in connection with the accompanying drawings.

BRIEF DESCRIPTION OF THE DRAWINGS

FIG. 11 is a drawing showing an example of the parameter table which is referred to when a parameter is selected in the first and second embodiments of the image coding process performed in the image encoder of the present invention.

FIG. 15(a) is a drawing showing an example of image data for one block used for estimation of the image attribute in the image attribute estimation process shown in FIG. 14 and FIG. 15(b) is a drawing showing the absolute value of each difference between each pixel data obtained for the image data shown in FIG. 15(a) and the right-hand pixel data.

DETAILED DESCRIPTION OF THE PREFERRED EMBODIMENTS

The embodiments of a moving picture transmitter including a moving picture encoder of the present invention will be explained with reference to the accompanying drawings.

Figure 1:
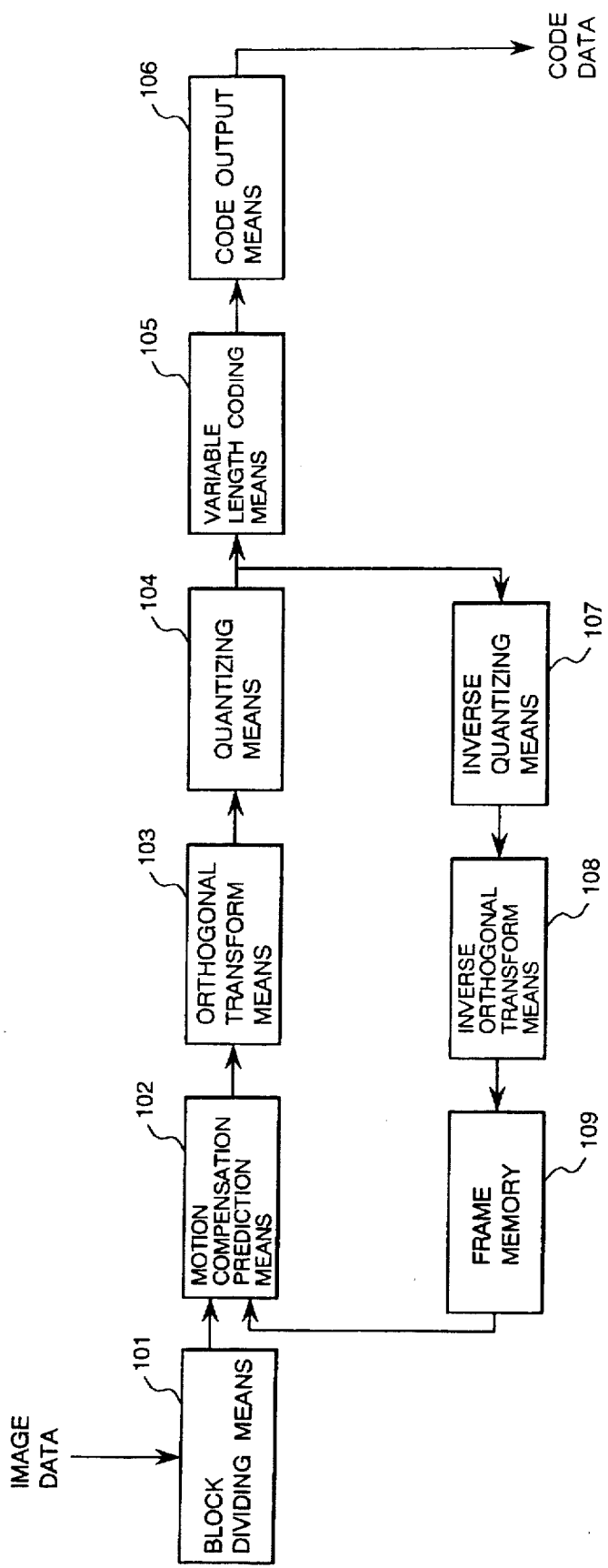
FIG. 1 is a block diagram showing an orthogonal transform system.
Figure 2:
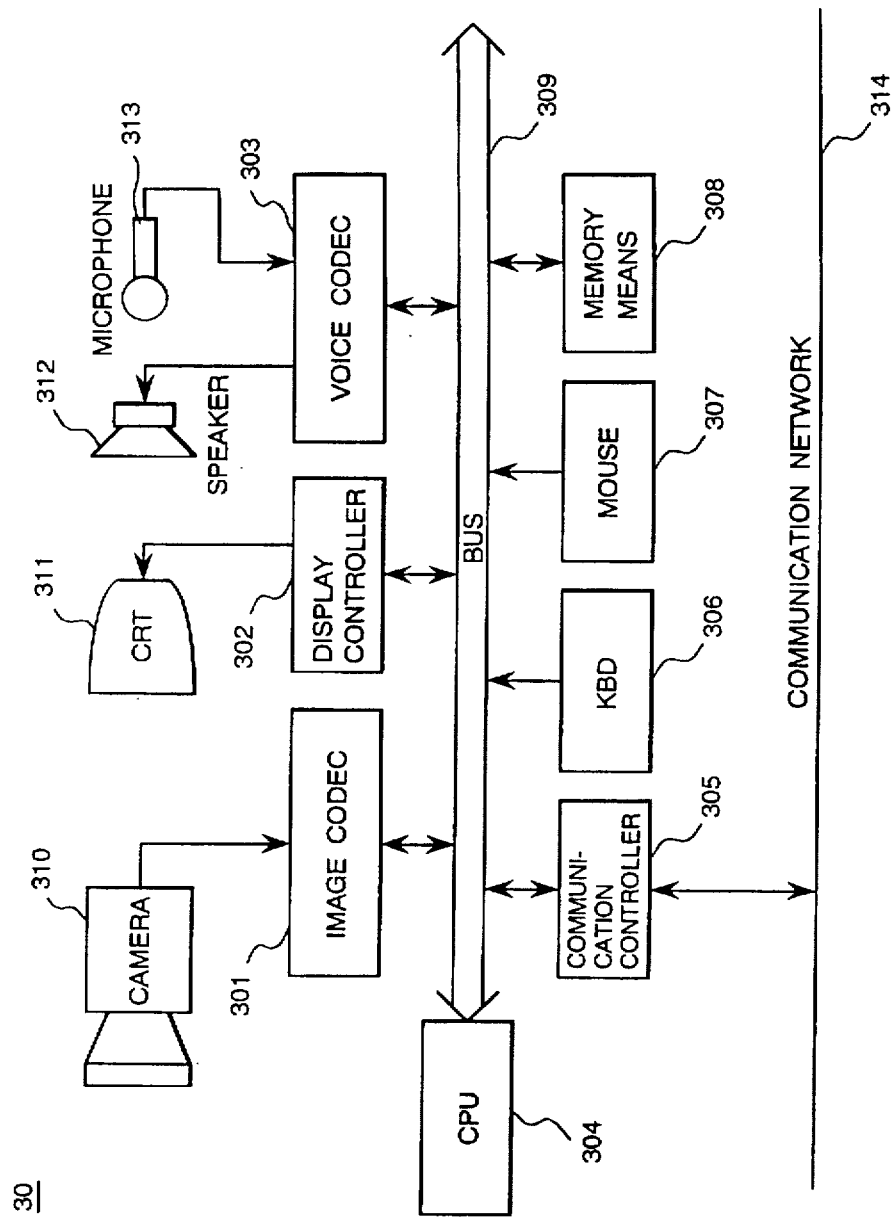
FIG. 2 is a block diagram showing an embodiment of the TV conference device of the present invention.

Firstly, the first embodiment in which the present invention is applied to a TV conference device will be explained. FIG. 2 is a system block diagram showing the first embodiment when a moving picture transmitter including a moving picture encoder of the present invention is applied to a TV conference device. A TV conference device 30 comprises an image CODEC (CODEC is a synthetic word of encoder and decoder) 301 for performing a coding process by converting images including moving pictures picked up by a camera 310 from analog to digital, a display controller 302 for controlling as displayed by display data on the screen of a CRT 311, a voice CODEC 303 for performing a voice input coding process for an analog voice signal inputted from a microphone 313 and a voice decoding output process for voice code data received from a communication network 314, a CPU 304, a communication controller 305, a KBD (keyboard) 306 and a mouse 307 which are data inputting means, a memory means 308, and a bus 309 and is connected to the communication network 314.

Figure 3:
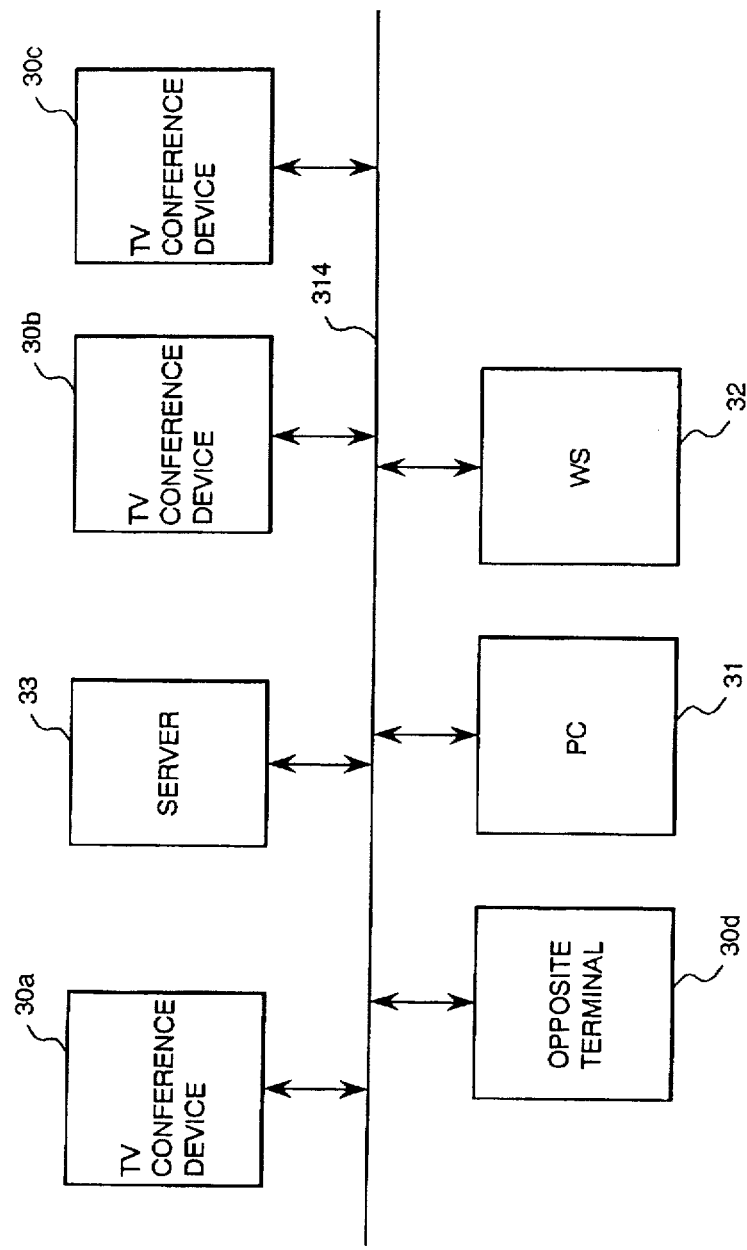
FIG. 3 is a schematic block diagram showing a whole system using the TV conference device of the present invention.

In this system, as shown in FIG. 3, the flow of processing when, for example, a TV conference device 30a transmits or receives images and voice to or from an opposite terminal 30d connected via the communication network 314 will be explained. In the TV conference device 30, data transfer via the image CODEC 301, the display controller 302, the voice CODEC 303, the communication controller 305, the keyboard 306, the mouse 307, the memory means 308, and the bus 309 is all controlled by the CPU 304.

The display controller 302 receives display data from the CPU 304, transforms the display data to a display signal, and outputs the display signal to the CRT 311 so as to control to display it as display data on the screen of the CRT 311. The vice CODEC 303 performs a voice input coding process for converting an analog voice signal inputted from the microphone 313 from analog to digital and then coding it by compression so as to obtain digital voice code data and a voice decoding output process for obtaining digital voice data by decoding voice code data received from the communication network 314, obtaining analog voice signal by converting the obtained digital voice data from digital to analog, and amplifying and outputting the voice signal to a speaker 312.

The CPU 304 in the TV conference device 30a receives a required code size (required value of code size) 502 (FIG. 5) transmitted by the opposite terminal 30d via the communication network 314, image code data 518, and voice code data via the communication controller 305, outputs the required code size (required value of code size) 502 and the image code data 518 to the image CODEC 301, and outputs the voice code data to the voice CODEC 303. The CPU 304 inputs image code data obtained by the image coding process from the image CODEC 301, inputs voice code data obtained by the voice coding process from the voice CODEC 303, and transmits these inputted image code data and voice code data to the communication network 314 via the communication controller 305.

Figure 5:
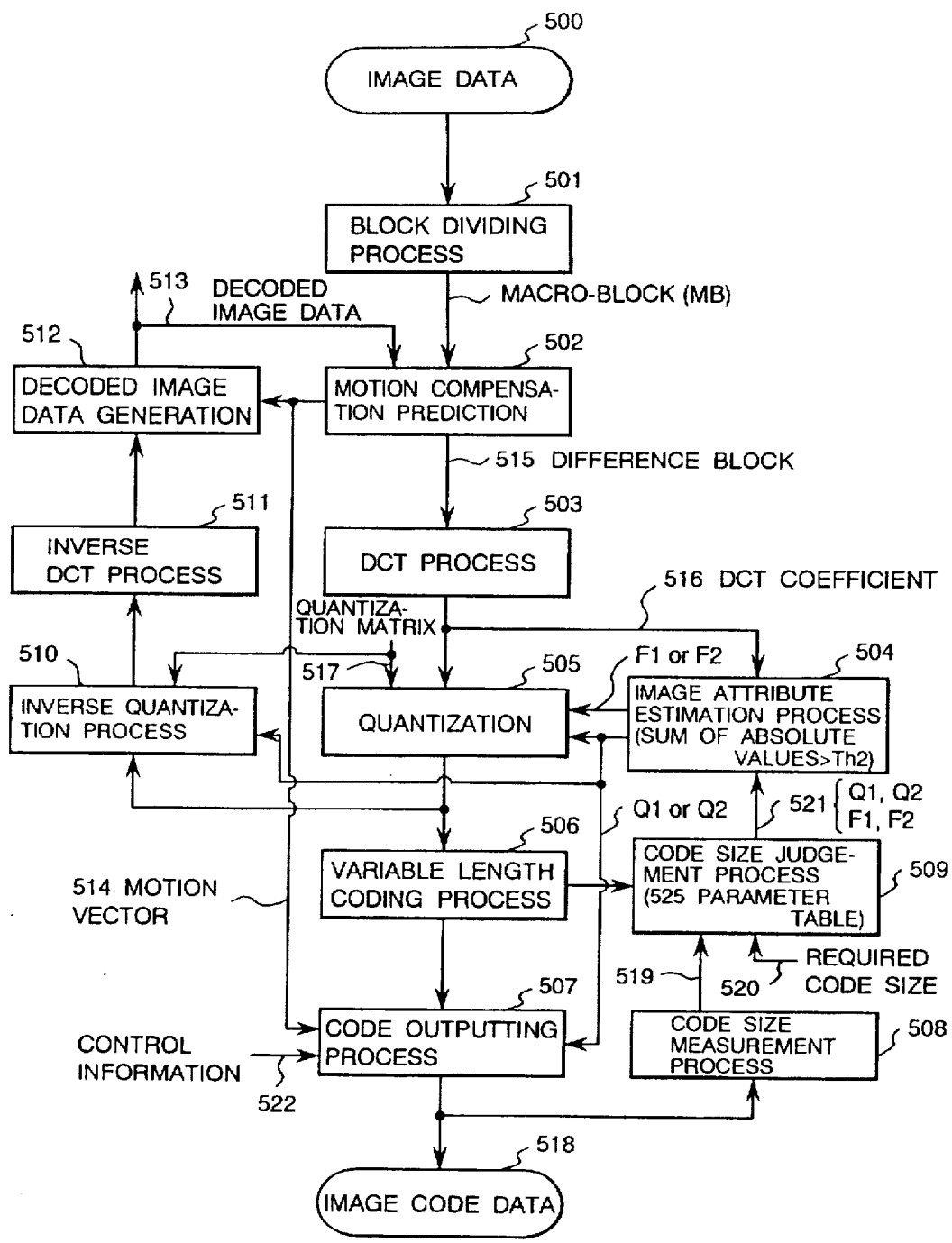
FIG. 5 is a flow chart showing a first embodiment of the image coding process performed in the image encoder of the present invention.
Figure 13:
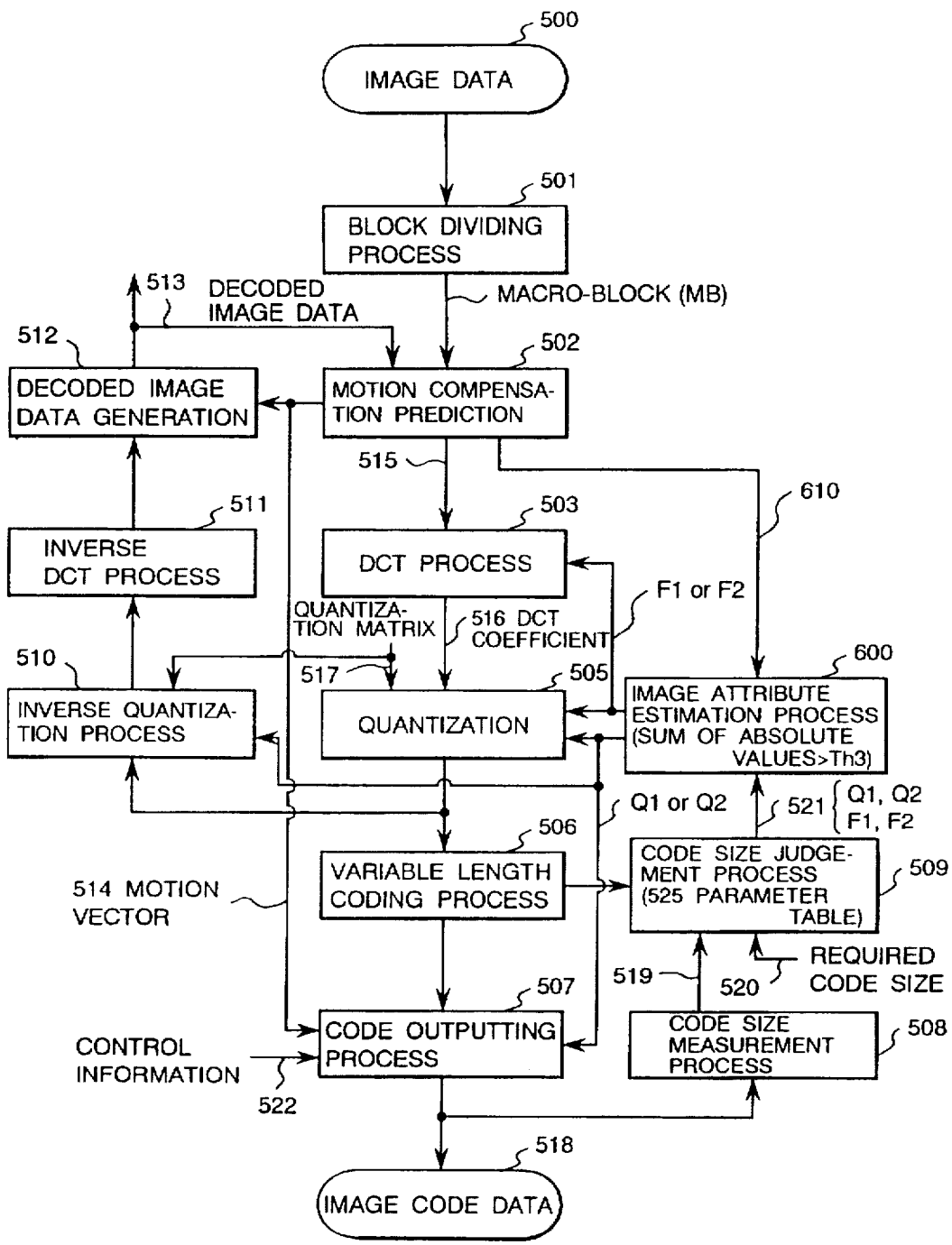
FIG. 13 is a flow chart showing the second embodiment of the image coding process performed in the image encoder of the present invention.

Then, the CPU 304 inputs decoded image data 513 obtained by an image decoding process 512 shown in FIGS. 5 and 13 from the image CODEC 301, outputs the inputted image data to the display controller 302, and displays it on the screen of the CRT 311.

It is possible for the CPU 304 to store image code data or voice code data inputted from the image CODEC 301 or the voice CODEC 303 in the memory means 308 once and then input it from the memory means 308 again and transmit it to the communication network 314 or to store image code data, voice code data, or a required code size inputted from the communication network 314 in the memory means 308 once and then input it from the memory means 308 again and output it to the image CODEC 301 or the voice CODEC 303. The communication controller 305 controls data transfer between the communication network 314 and the TV conference device. The memory means 308 is a memory means constituted by using a memory medium such as a semiconductor memory or a magnetic disk. The communication network 314 comprises an LAN (local area network), WAN (wide area network), or ATM (asynchronous transfer mode) network.

FIG. 3 shows an embodiment of the system configuration of the present invention. Namely, the TV conference devices 30a, 30b, 30c, and 30d, a server 33, a PC (personal computer) 31, and a WS (work station) 32 are connected to the communication network 314 and they are structured so that moving pictures and voice can be transmitted between the TV conference devices 30a, 30b, 30c, and 30d or between the TV conference devices 30a, 30b, 30c, and 30d and the PC 31 or the WS 32. The server 33 is a terminal having a network control function.

Next, a method of deciding a required code size and storing it in an RAM 403 in the image CODEC 301 will be explained.

Namely, as a first method, the CPU 304 counts the number of communication packets passing the communication network 314 during a period from the current point of time to a certain point of time in the past and decides a required code size by using the number of packets counted, for example, with reference to a parameter table stored and prepared in the memory means 308 beforehand. The CPU 304 stores the required code size decided in the memory means 308 once or directly in the RAM 403 in the image CODEC 301 via a bus interface 404 and stores it also in the voice CODEC 303 at the same time.

As a second method, the CPU 304 checks the transmission capacity of the communication network 314 before a user of the TV conference device 30 or the TV conference device 30 starts transmission and reception of images and voice to or from an opposite device and decides a required code size by converting the transmission capacity to a required code size or decides a required code size by using the transmission capacity, for example, with reference to a parameter table stored and prepared in the memory means 308 beforehand.

As a third method, the CPU 304 calculates the amount of code data stored in the memory means 308 on the basis of the input amount of image code data from the image CODEC 301 and the transmission amount of image code data to the communication network 314 and decides a required code size on the basis of the calculation result.

As a fourth method, the CPU 304 receives numerical data of the capacity of the image decoding process of an opposite device, numerical data of the capacity of the image display process of the opposite device, or numerical data of the capacity of the reception process of the opposite device from the opposite device before starting transmission or reception of images and voice to or from the opposite device and decides a required code size by using the data, for example, with reference to a parameter table stored and prepared in the memory means 308 beforehand.

As a fifth method, the CPU 304 measures the usable storage capacity of the memory means 308 and decides a required code size by using the measured result, for example, with reference to a parameter table stored and prepared in the memory means 308 beforehand.

As a sixth method, the CPU 304 accesses the terminal 33 having a network control function such as the server which is connected to the communication network 314, receives the number of terminals for transmitting and receiving data using the communication network 314 from the terminal 33, and decides a required code size by using the number of terminals with reference to a parameter table.

As a seventh method, the CPU 304 fetches a numerical value (for example, a subjective evaluation value of image quality requested by a user, etc.) which can be used for decision of a required code size from a user using the TV conference device via the keyboard 306 or the mouse 307 and decides a required code size by using the numerical value with reference to a parameter table prepared beforehand.

Next, the image CODEC 301 will be explained concretely with reference to FIG. 4.

Figure 4:
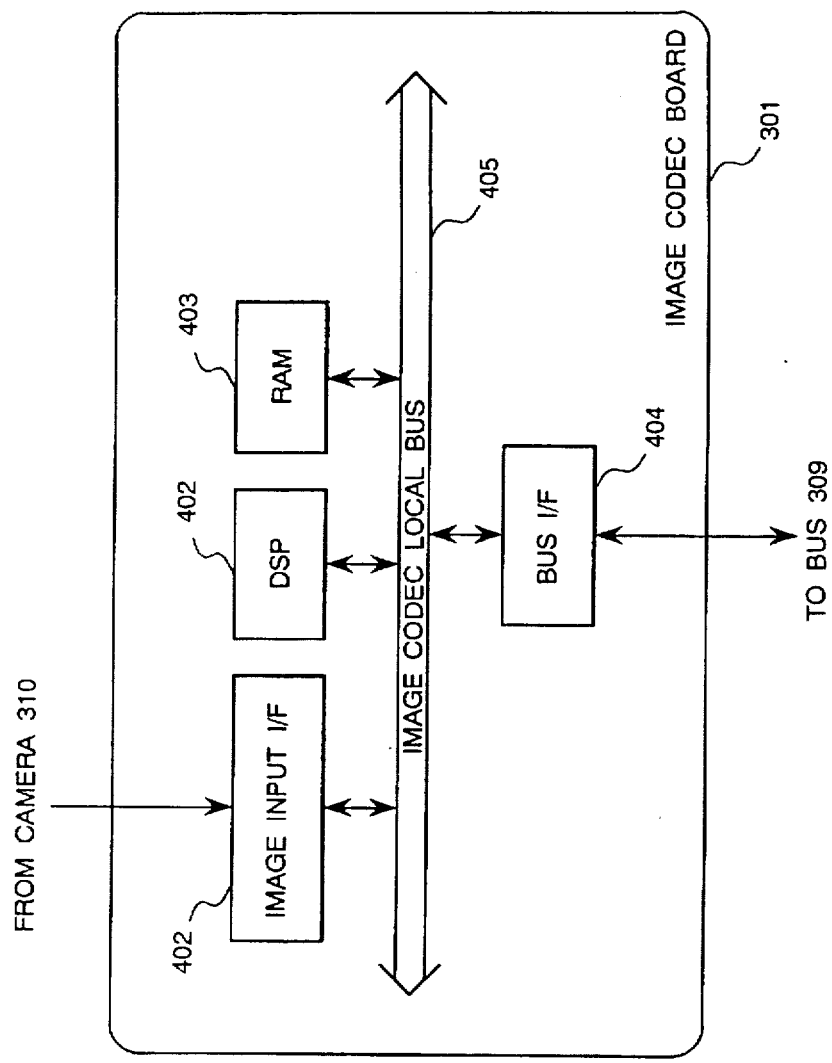
FIG. 4 is a drawing showing an actual constitution of an image encoder (image CODEC) installed in the TV conference device of the present invention.

FIG. 4 is a block diagram of the image CODEC 301. The image CODEC 301 comprises an image input interface 401, a DSP (digital signal processor) 402, an RAM (random access memory) 403, an image CODEC bus 404, and a bus interface 405 and is connected to a bus 309.

As to the processing algorithm of the image CODEC 301, data transfer between the RAM 403 and the CPU 304 is realized under control of the CPU 304 and processes other than data transfer between the RAM 403 and the CPU 304 are realized when the software stored in the RAM 403 is executed by the DSP 402.

The DSP 402 in the image CODEC 301 performs an image input process for storing image data obtained by converting an analog image signal inputted from the camera 310 from analog to digital in the RAM 403 in the determined format, an image coding process for transforming image data stored in the RAM 403 to image code data, and an image decoding process for decoding image code data which is inputted from the CPU 304 and received from the communication network 314 via the communication controller 305 and transforming it to image data. For example, in the RAM 403 of the image CODEC 301, as mentioned above, the required code size is decided by the CPU 304 and stored. In the RAM 403, a data table shown in FIG. 11 is stored by using an inputting means such as the KBD (keyboard) 306.

Next, the procedure of the image coding process executed in the image CODEC 301 will be explained with reference to FIG. 5. Namely, FIG. 5 is a flow chart showing the procedure of the image coding process. In the RAM 403, image data (moving picture data) 500 obtained by converting an analog image signal inputted from the camera 310 from analog to digital is stored in the determined format.

Figure 6:
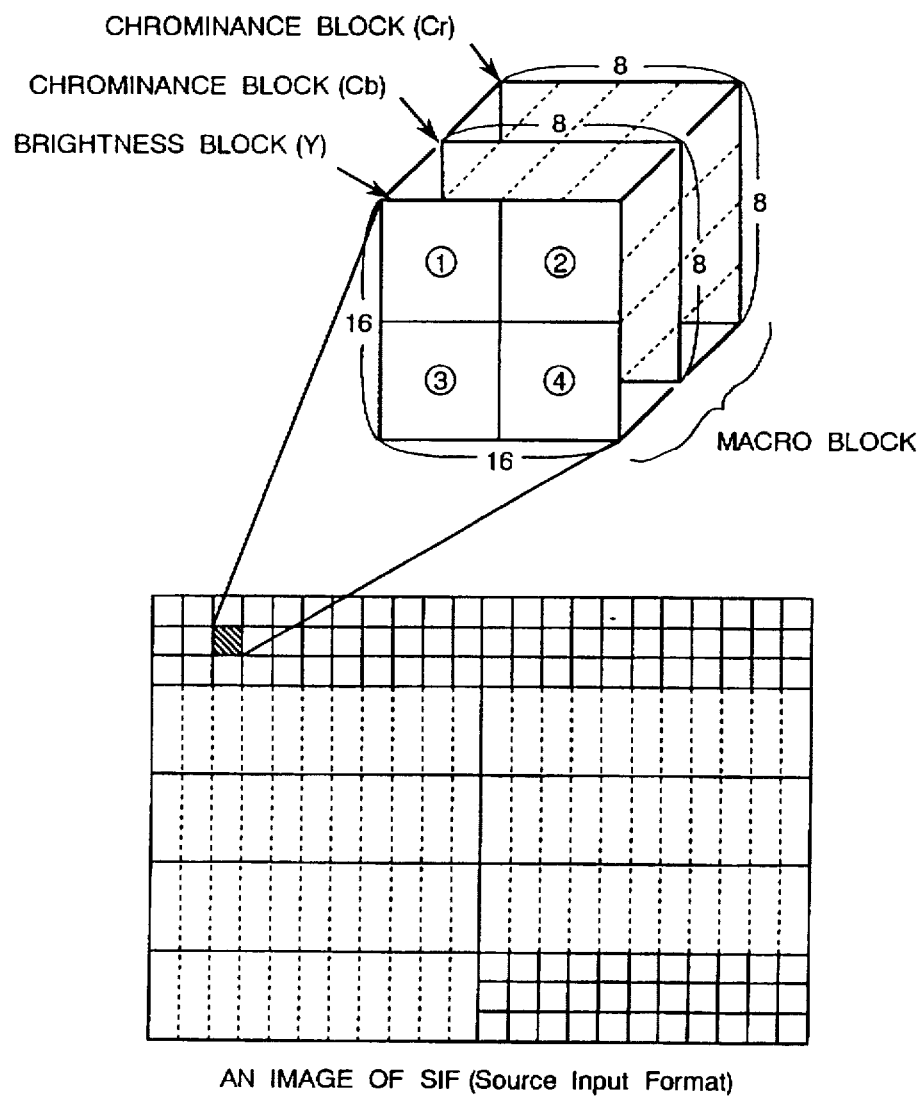
FIG. 6 is a drawing showing the status for generating a macro block from an image of SIF (source input format).

Firstly, the DSP 402 divides the image data 500 stored in the RAM 403 into blocks of n pixels×n pixels (for example, 8 pixels×8 pixels) as shown in FIG. 6 in a block dividing process. In FIG. 6, the image data of an image of SIF (source input format) is divided into, for example, 22 macro blocks (2n pixels×2n pixels, for example, 16×16 pixels) in the horizontal direction and divided into, for example, 15 macro blocks (MB) (2n pixels×2n pixels, for example, 16×16 pixels) in the vertical direction. Each macro block (MB) is generated by integrating four brightness blocks (Y) [1], [2], [3], and [4] (n pixels×n pixels, for example, 8×8 pixels) and two blocks of a chrominance block (Cb) (n pixels×n pixels, for example, 8×8 pixels) and a chrominance block (Cr) (n pixels×n pixels, for example, 8×8 pixels).

Next, the DSP 402 generates macro blocks by integrating four brightness blocks and two chrominance blocks which are obtained sequentially by the block dividing process 501 in a motion compensation prediction 502, generates a motion vector 513 for each macro block (MB) sequentially by performing operations between the macro blocks and the decoded image data stored in the frame memory (RAM) 403 sequentially in a decoded image data generation 512, and generates brightness blocks (in the order of [1], [2], [3], and [4]) for each macro block and difference blocks 515 for each chrominance block Cb and chrominance block Cr.

Next, the DSP 402 executes two-dimensional discrete cosine transform (two-dimensional DCT: discrete cosine transform) (a signal is transformed by using the discrete cosine function, it may be considered that the space axis is transformed to the frequency axis in the same way as with the Fourier transform for transforming the time axis to the frequency axis) which is a kind of orthogonal transform for the difference blocks 515 generated by the motion compensation prediction 502 and obtains DCT coefficients 516 which are a kind of an orthogonal transform coefficient in a DCT process 503.

Figure 8:
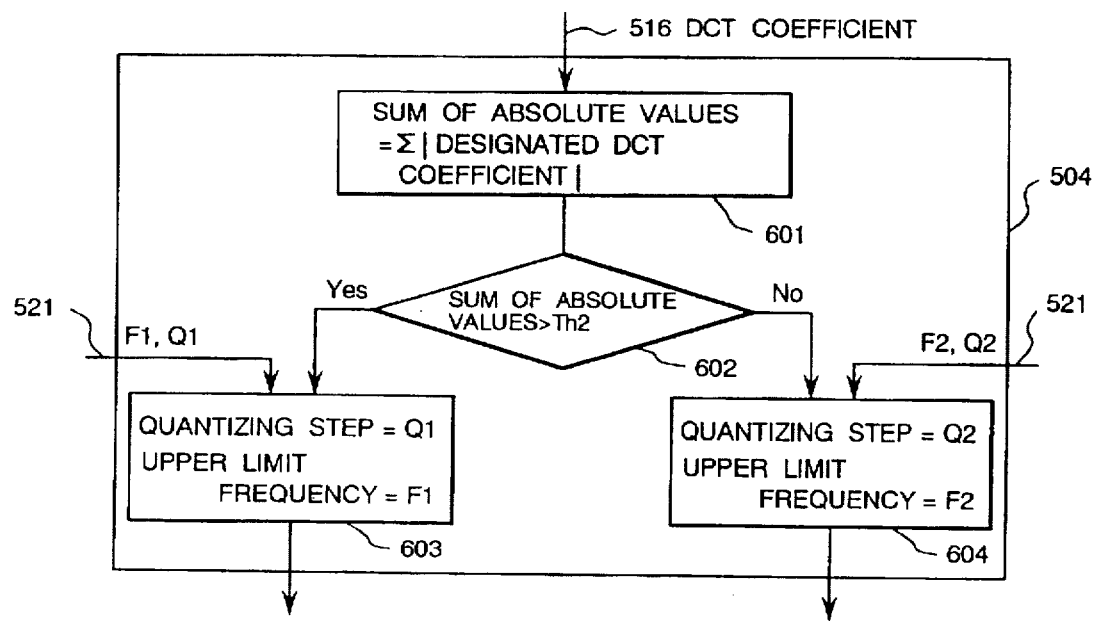
FIG. 8 is a flow chart showing the procedure of the image attribute estimation process in the first embodiment of the image coding process performed in the image encoder of the present invention.
Figure 9:
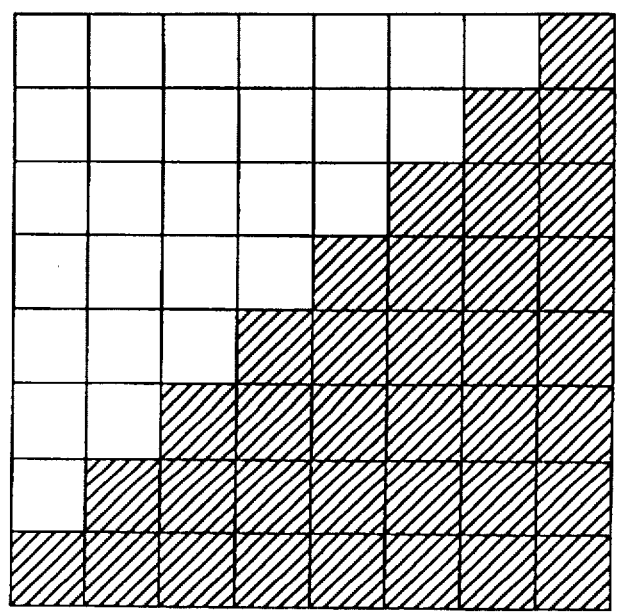
FIG. 9 is a drawing showing an example of the DCT coefficient which is referred to when the image attribute is estimated in the image attribute estimation process shown in FIG. 8.

Next, an image attribute estimation process 504 which is executed by the DSP 402 will be explained with reference to FIGS. 8 and 9. FIG. 8 is a flow chart showing the procedure of the image attribute estimation process 504. FIG. 9 is a drawing showing an example of the DCT coefficient which is used when the image attribute is estimated. Namely, in FIG. 8, Th2 indicates a threshold value of the sum of absolute values of the DCT coefficient used to estimate the image attribute. Q1 and Q2 (Q1>Q2) indicate quantizing steps selected by a code size judgment process 509, and F1 and F2 (F1>F2) indicate space frequencies selected by the code size judgment process 509. Therefore, a sum of absolute value calculation process 601 in the image attribute estimation process 504 calculates, for example, the sum of absolute values of the DCT coefficient (DCT coefficient which is a kind of the orthogonal transform coefficient in the designated hatched area) corresponding to the high space frequency included in the diagonal lines shown in FIG. 9 among the DCT coefficients 516 obtained from the DCT process 503. The DCT coefficients in the lower right of FIG. 9 correspond to higher space frequencies and the DCT coefficients in the upper left of FIG. 9 correspond to lower space frequencies. In the case of an image including a sudden gradation change, there is a tendency that the absolute value of a DCT coefficient corresponding to a high space frequency is large. As mentioned above, for the number of DCT coefficients (the number indicated by the hatched area shown in FIG. 9, that is, the number varies with how to draw diagonal lines) for obtaining the sum of absolute values in the sum of absolute value calculation process 601, a value which is obtained experientially by experimentation is used. Namely, the number of DCT coefficients for obtaining the sum of absolute values is designated by inputting using an inputting means such as the KBD 306 and writing into the RAM 403 or others.

Next, a judgment process 602 in the image attribute estimation process 504 judges whether it is an image including a sudden gradation change or an image having little gradation change (estimates the image attribute) by comparing with the threshold value Th2 (also for this threshold value Th2, a value which is obtained experientially by experimentation is used and the threshold value Th2 is set by inputting using an inputting means such as the KBD 306 and writing into the RAM 403 or others) of the sum of absolute values of the DCT coefficients on the basis of the sum of absolute values (depending on whether the sum of absolute values>Th2). When it is an image including a sudden gradation change, the judgment process 602 executes a parameter selection process 603 and when it is an image having little gradation change, the judgment process 602 executes a parameter selection process 604. The parameter selection process 603 selects Q1 for the quantizing step and selects F2 for the upper limit frequency. It is possible to provide a plurality of threshold values Th2 instead of one. If this occurs, it is desirable to provide quantizing steps and space frequencies whose number is larger than the number of set threshold values by one as a parameter table 525 respectively. A process for selecting the quantizing step Q1 or Q2 in the parameter selection process 603 or 604 can be executed for each macro block (MB) and a process for selecting the upper limit frequency F1 or F2 in the parameter selection process 603 or 604 can be executed for each brightness block (Y) [1], [2], [3], or [4] and for each chrominance block (Cb) or (Cr).

Figure 7:
FIG. 7 is a drawing showing an example of a quantization matrix.

Next, a quantization process 505 which is executed by the DSP 402 will be explained. Namely, the quantization process 505 obtains a quantization coefficient by dividing DCT coefficients corresponding to space frequencies which are equal to the upper limit frequency F1 or F2 or less selected by the image attribute estimation process 504 among the DCT coefficients obtained from the DCT process 503 by a value obtained by multiplying the corresponding components of a quantization matrix 517 (an example is shown in FIG. 7 and also this quantization matrix 517 is inputted by using an inputting means such as the KBD 306 and stored in the RAM 403, that is, the quantization matrix 517 can be designated for each set of one or a plurality of frames (screens) which are called a sequence) by the quantizing step Q1 or Q2 obtained by the image attribute estimation process 504 and obtains a quantization coefficient by setting DCT coefficients corresponding to space frequencies more than the upper limit frequency F1 or F2 to zero practically. Namely, for DCT coefficients corresponding to space frequencies more than the upper limit frequency F1 or F2, a quantization coefficient is obtained by setting them to zero practically. For DCT coefficients corresponding to space frequencies which are equal to the upper limit frequency F1 or F2 or less, when a value obtained by multiplying the corresponding components of the quantization matrix by the quantizing step Q1 or Q2 obtained by the image attribute estimation process 504 is large, a quantization coefficient which is roughly quantized because it is divided by this value is obtained and when a value obtained by multiplying the corresponding components of the quantization matrix by the quantizing step Q1 or Q2 obtained by the image attribute estimation process 504 is small, a quantization coefficient which is finely quantized because it is divided by this value is obtained.

Next, the DSP 402 transforms only quantization coefficients which are selected by the image attribute estimation process 504 and correspond to space frequencies which are equal to the upper limit frequency F1 or F2 or less among the quantization coefficients obtained by the quantization process 505 to variable length codes (VLC) in a variable length coding process 506. The reason is that for DCT coefficients corresponding to space frequencies more than the upper limit frequency F1 or F2, a quantization coefficient is obtained by setting them to zero practically in the quantization process 505. Namely, since DCT coefficients corresponding to space frequencies more than the upper limit frequency F1 or F2 become zero practically, variable length codes are also eliminated practically, and occurrence of useless code data can be prevented in a code outputting process 507, and as a result, the code size can be fit to the required code size (required value of code size) easily.

Particularly as shown in FIG. 11, a parameter table 525 having the relation of F1>F2 and Q1>Q2 is stored and prepared in the RAM 403, so that the following operation effect is obtained. Namely, for an image including a sudden gradation change, the sum of absolute values of DCT coefficients corresponding to high space frequencies becomes larger than the threshold value Th2 (the relation of sum of absolute values>Th2 is Yes), and Q1 larger than Q2 is selected as a quantizing step in the parameter selection process 603 and roughly quantized, and F1 extremely larger than F2 is selected as an upper limit frequency at the same time, and a quantization coefficient is obtained so as to include a sudden gradation change equal to F1 or less and transformed to a variable length code, and image code data which can express a sudden gradation change is obtained by the code outputting process 507 which will be explained next, and furthermore, the required code size (required value of code size) can be satisfied from the aforementioned relation between Q1 and F1. For an image having little gradation change inversely, the sum of absolute values of DCT coefficients corresponding to high space frequencies becomes smaller than the threshold value Th2 (the relation of sum of absolute values>Th2 is No), and smaller Q2 is selected as a quantizing step in the parameter selection process 604 and finely quantized, and extremely small F2 is selected as an upper limit frequency at the same time, and a quantization coefficient is obtained only for little gradation change equal to F2 or less and transformed to a variable length code, and image code data having little occurrence of a block strain or a false outline due to a quantization coefficient which is finely quantized by the code outputting process 507 which will be explained next, and furthermore, the required code size (required value of code size) can be satisfied from the relation between Q2 and F2.

Next, the DSP 402 adds the control information 522 used for decoding (the horizontal size of the screen (the number of horizontal pixels of an image) and vertical size (the number of vertical pixels of an image), the aspect ratio of pixel interval, the number of macro blocks in the screen, the number of macro blocks per second, and the picture rate (the display period of an image), the bit rate (bit rate for restricting the occurrence bit amount, rounded up in unit of 400 bps), the VBV (video buffering verifier) buffer size (parameter for deciding the size VBV of a virtual buffer for restriction of code generation amount) 522 and others to the variable length codes obtained by the variable length coding process 506, the quantizing step Q1 or Q2 selected by the image attribute estimation process 504, and the motion vector 514 generated by the motion compensation prediction 502 (coded by a variable length code (VLC) in which the differences between the horizontal component and the vertical component of the forward motion vector of the MB and those of the previous MB vector are expressed by forward f (f code of the ISO standard) and coded by a variable length code (VLC) in which the differences between the horizontal component and the vertical component of the backward motion vector of the MB and those of the previous MB vector are expressed by backward f) so as to generate image code data 518 in the code outputting process 507 and stores the image code data 518 in the RAM 403.

Next, the DSP 402 measures the amount of image code data in a code size measurement process 508 and obtains a measured value of code size 519.

Figure 10:
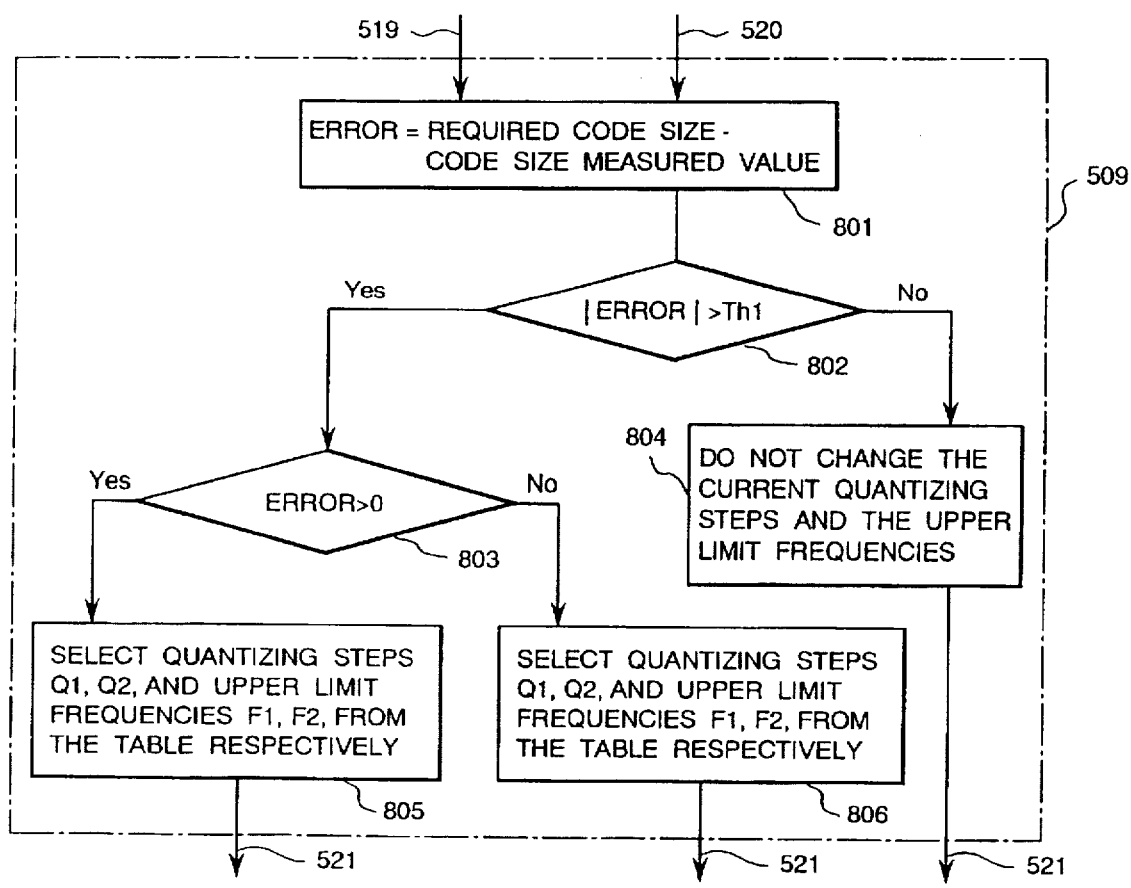
FIG. 10 is a flow chart showing the procedure of the image code size judgment process in the first and second embodiments of the image coding process performed in the image encoder of the present invention.

Next, the procedure of the code size judgment process 509 executed by the DSP 402 will be explained with reference to FIGS. 10 and 11. FIG. 10 is a flow chart showing the procedure of the image code size judgment process and FIG.

11 shows an example of the parameter table 525 which is stored and prepared by inputting using an inputting means such as the KBD 306 so as to refer to when a parameter is selected and writing in the RAM 403 or others. The procedure of preparation of the parameter table 525 will be explained in detail later. Namely, in FIG. 10, symbol Th1 indicates a threshold value of an error between the measured value of code size 519 obtained by the code size measurement process 508 and the required code size (required value of code size) 520 which is supplied from the CPU 304 and stored in the RAM 403 and it is set by using a value which is obtained experientially by experimentation, inputting using an inputting means such as the KBD 306, and writing into the RAM 403 or others. In FIGS. 10 and 11, Q1 and Q2 (Q1>Q2) are quantizing steps and F1 and F2 (F1>F2) are space frequencies. The values of space frequencies shown in FIG. 11 are values when the lowest space frequency among the 64 space frequencies corresponding to the 64 DCT coefficients is assumed as 1, and the value increments one by one as the space frequency increases, and the highest space frequency is assumed as 64. When the quantizing steps Q1 and Q2 are small (when Q1 increases suddenly from 2 to 20 and Q2 does not change greatly such as from 2 to 4), there is a tendency that the upper limit frequency F1 does not change such as from 64 to 64, while the upper limit frequency F2 decreases suddenly from 64 to 6. When the quantizing steps Q1 and Q2 increase (when Q1 increases gradually from 20 to 62 and Q2 increases suddenly from 4 to 40), there is a tendency that the upper limit frequency F1 does not change such as from 64 to 64, while the upper limit frequency F2 also does not change such as from 6 to 6. When the quantizing steps Q1 and Q2 are large (when Q1 does not change such as from 62 to 62 and Q2 does not change such as from 40 to 40), there is a tendency that the upper limit frequency F1 decreases suddenly from 64 to 1, while the upper limit frequency F2 also changes from 6 to 1.

Firstly, an error calculation process 801 calculates an error of the measured value of code size 519 obtained by the code size measurement process 508 for the required code size (required value of code size) 520. Next, a judgment process 802 judges whether the code size 519 of image code data obtained by the coding process 507 is close to the required code size (required value of code size) 520 or not on the basis of the aforementioned error and the threshold value Th1. When the error is more than Th1 (when there is a considerable difference between the code size of image code data and the required code size), the judgment process 802 executes a process 803 and when the error is not more than Th1 (when the code size of image code data is nearly equal to the required code size), the judgment process 802 executes a process 804. The judgment process 803 judges which is larger, the required code size (require value of code size) or the code size of image code data obtained by the coding process 507. When the former is larger (when the code size of image code data is sufficiently larger than the required code size), the judgment process 803 executes a process 805 and when the latter is larger (when the code size of image code data is extremely more than the required code size), the judgment process 803 executes a process 806. Since the code size close to the required value of code size is obtained by the coding process, a parameter selection process 804 selects four parameter combinations comprising quantizing steps Q1 and Q2 and upper limit frequencies F1 and F2 which are the same as those selected previously from the parameter table 525 shown in FIG. 11. Since the code size smaller than the required value of code size is obtained by the coding process, a parameter selection process 805 selects four parameter combinations at the same location as or below that of the previous case from the parameter table 525 shown in FIG. 11 as four parameter combinations comprising quantizing steps Q1 and Q2 and upper limit frequencies F1 and F2. Since the code size larger than the required value of code size is obtained by the coding process, a parameter selection process 806 selects four parameter combinations at the same location as or above that of the previous case from the parameter table 525 shown in FIG. 11 as four parameter combinations comprising quantizing steps Q1 and Q2 and upper limit frequencies F1 and F2. Namely, when the code size of image code data is extremely more than the required code size, it is desirable to select four parameter combinations above the same location as that of the previous case from the parameter table 525 shown in FIG. 11 as four parameter combinations comprising quantizing steps Q1 and Q2 and upper limit frequencies F1 and F2. When the code size of image code data is sufficiently larger than the required code size inversely, it is desirable to select four parameter combinations below the same location as that of the previous case from the parameter table 525 shown in FIG. 11 as four parameter combinations comprising quantizing steps Q1 and Q2 and upper limit frequencies F1 and F2.

It is not always necessary to execute the code size judgment process 509 by the same count as that of the image attribute estimation process 504 and needless to say, it is possible to add the measured value of code size obtained by the code size measurement process 508 and execute the code size judgment process 509, for example, for each frame (each screen) of an input moving picture by using the added result.

Next, the DSP 402 multiplies the quantization coefficients corresponding to the space frequencies of the upper limit frequency F1 or F2 or less which are selected by the image attribute estimation process 504 among the quantization coefficients obtained by the quantization process 505 using a value obtained by multiplying the corresponding component of the quantization matrix 517 by the quantizing step Q1 or Q2 selected by the image attribute estimation process 504 and obtains an inverse quantization coefficient by setting the coefficients corresponding to space frequencies more than the upper limit frequency F1 or F2 to zero practically in the inverse quantization process 510.

Next, the DSP 402 obtains an inverse DCT coefficient by executing two-dimensional IDCT (inverse DCT) for the inverse quantization coefficient obtained by the inverse quantization process 510 in an inverse DCT process 511. Next, the DSP 402 adds the inverse DCT coefficient obtained by the inverse DCT process 511 and the decoded image data stored in the frame memory (RAM), generates new decoded image data used for the motion compensation prediction 502 when the next frame (screen) is coded, and stores the decoded image data in the frame memory (RAM) 403 in the decoded data generation process 512.

As mentioned above, according to the first embodiment, the image CODEC 301 in the TV conference device 30a receives the required code size (required value of code size) from the opposite terminal 30d, selects a suitable combination of quantizing steps Q1 and Q2 and upper limit frequencies F1 and F2 from the parameter table 525 which is prepared beforehand according to an error between the required code size and the measured value of code size which is obtained by measuring decoded image data by the code size measurement process 508, obtains the image code data 518 which can express a sudden gradation change for an image including a sudden gradation change by increasing the upper limit frequency under the condition of image coding in a code size close to the required code size of the opposite terminal 30d by setting a quantizing step and an upper limit frequency from a combination of the selected quantizing steps Q1 and Q2 and upper limit frequencies F1 and F2 on the basis of the DCT coefficient 516 with respect to the content of an image in each area on the screen comprising one or a plurality of macro blocks (MB) in the image attribute estimation process 504, and obtains the image code data 518 having little occurrence of a block strain or a false outline by finely quantizing an image having little gradation change, and the CPU 304 can transmit the image code data 518 to the opposite terminal 30d via the communication network 314, and as a result, a TV conference device based on the international standard of image coding can be provided.

Figure 12:
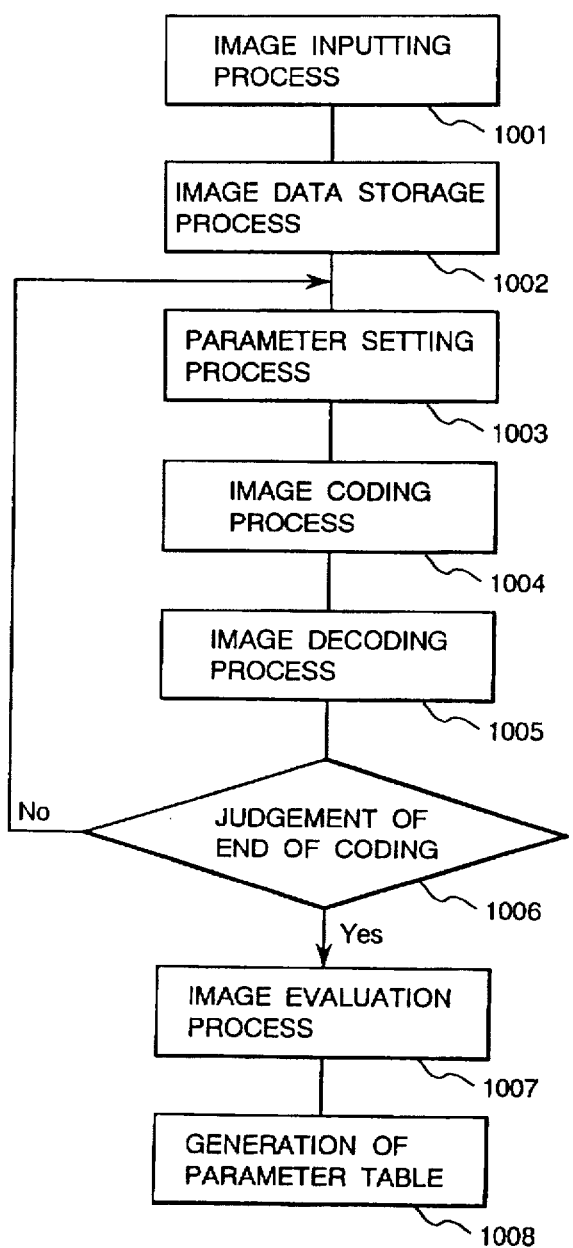
FIG. 12 is a flow chart showing the experiment procedure for preparing the parameter table shown in FIG. 11.

Next, the preparation procedure of the parameter table 525 shown in FIG. 11 which is stored and prepared in the RAM 403 using an inputting means such as the KBD 306 will be explained with reference to FIG. 12. Namely, FIG. 12 is a flow chart showing the experiment procedure for deciding parameters by experimentation using an image encoder (image CODEC) and others so as to prepare the parameter table 525 shown in FIG. 11.

An image inputting process 1001 is a process for inputting an analog moving picture signal to an image encoder by an image picking-up means such as a camera and an image reproducing means such as a VTR.

An image data storage process 1002 is a process for obtaining digital image data by converting the aforementioned moving picture signal from analog to digital and storing the image data in the RAM or on a magnetic disk.

A coding parameter setting process 1003 is a process for setting values of a quantizing step and an upper limit frequency.

An image coding process 1004 is a process for coding moving picture data using the aforementioned quantizing step and the aforementioned upper limit frequency and obtaining image code data.

An image decoding process 1005 is a process for decoding the aforementioned image code data and obtaining image decode data.

A judgment of end of coding 1006 is a process for judging whether image coding is executed or not using combinations of all quantizing steps and upper limit frequencies.

An image evaluation process 1007 is a process for classifying image code data into a plurality of groups depending on the code size and deciding image decode data of the best image quality for each group by subjective evaluation, etc.

A generation of parameter table 1008 is a process for collecting combinations of quantizing steps and upper limit frequencies corresponding to the image decode data which is evaluated as best by the image evaluation process 1007 for all groups and preparing the parameter table 525 corresponding to moving pictures inputted by the image inputting process 1001.

By executing the processes from the process 1001 to the process 1008 explained above for a plurality of moving pictures having different attributes, the parameter table 525 can be prepared.

Next, the second embodiment wherein the present invention is applied to a TV conference device will be explained. In the TV conference device in the second embodiment, the constitution and processes thereof are the same as those of the first embodiment basically except the image attribute estimation process among the image coding process executed in the image CODEC.

The procedure of the image coding process in the second embodiment will be explained hereunder by referring to FIG. 13. Namely, FIG. 13 is a flow chart showing the procedure of the image coding process in the second embodiment.

Figure 14:
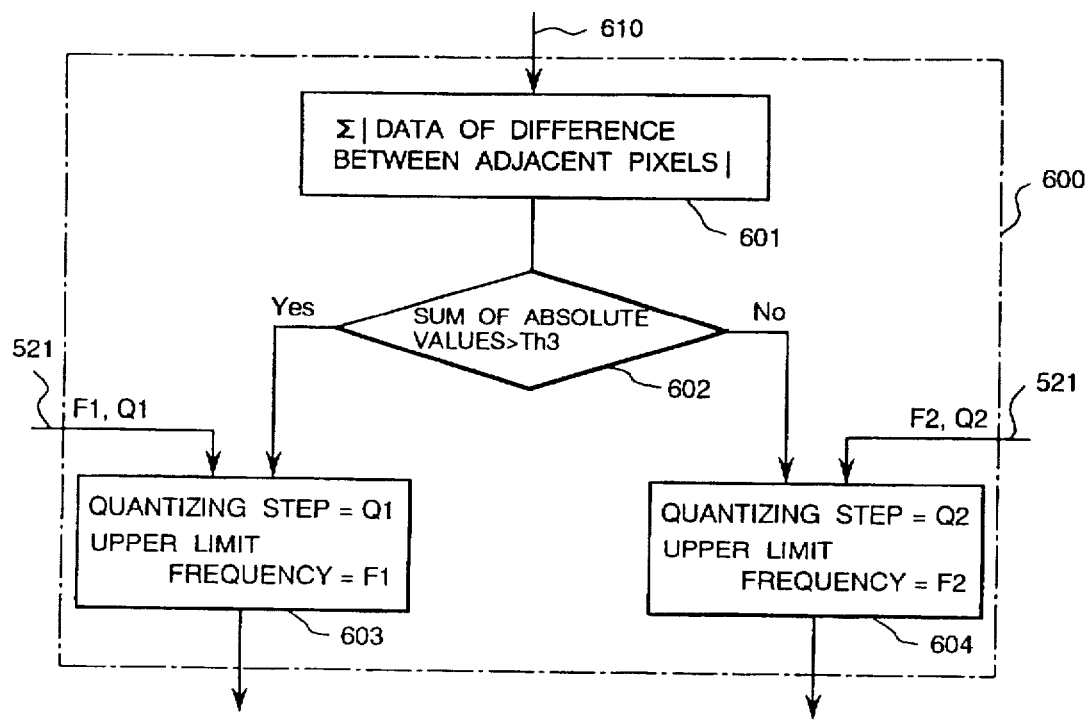
FIG. 14 is a flow chart showing the procedure of the image attribute estimation process in the second embodiment of the image coding process performed in the image encoder of the present invention.

Next, an image attribute estimation process 600 which is executed by the DSP 402 will be explained with reference to FIGS. 14 and 15. The image attribute estimation process 600 executed by the DSP 402 is a process which can be executed for each macro block (MB). FIG. 14 is a flow chart showing the procedure of the image attribute estimation process 600. FIG. 15(a) is a drawing showing an example of image data for one block which is used for estimation of the image attribute and FIG. 15(b) is a drawing showing an absolute value of a difference between the pixel data obtained from the image data shown in FIG. 15(a) and the right-hand pixel data thereof.

In FIG. 14, Th3 indicates a threshold value of the sum of absolute values of differences between adjacent pixels of image data of the difference block, Q1 and Q2 (Q1>Q2) indicate quantizing steps selected by a code size judgment process 509, and F1 and F2 (F1>F2) indicate space frequencies selected by the code size judgment process 509.

Firstly, a sum of absolute values calculation process 601 calculates a sum of absolute values of differences between adjacent pixels of the image data of a difference block 610 on the basis of the difference block 610 generated by the motion compensation prediction 502. FIG. 15(a) shows an example of image data for one block and FIG. 15(b) shows an absolute value of a difference between the pixel data obtained from the image data shown in FIG. 15(a) and the right-hand pixel data thereof. However, the right-most pixel data in the block has no right-hand pixel data in the block, so that the eight pixel data at the right end shown in FIG. 15(a) are not calculated. For an image including a sudden gradation change, there exists a tendency that the sum of absolute values increases.

Next, the judgment process 602 compares the sum of absolute values with the threshold value Th3 and judges whether it is an image including a sudden gradation change (the sum of absolute values>Th3 is Yes) or an image having little gradation change (the sum of absolute values>Th3 is No) on the basis of the sum of absolute values. When it is an image including a sudden gradation change (the sum of absolute values>Th3 is Yes), the judgment process 602 executes the process 603 and when it is an image having little gradation change (the sum of absolute values>Th3 is No), the judgment process 602 executes the process 604. The parameter selection process 603 selects Q1 as a quantizing step and F1 as an upper limit frequency from the four parameter combinations comprising the quantizing steps Q1 and Q2 and the upper limit frequencies F1 and F2 which are selected from the parameter table 525 by the code size judgment process 509. The parameter selection process 604 selects Q2 as a quantizing step and F2 as an upper limit frequency from the four parameter combinations comprising the quantizing steps Q1 and Q2 and the upper limit frequencies F1 and F2 which are selected from the parameter table 525 by the code size judgment process 509.

Also for the threshold value Th3, a value which is obtained experientially by experimentation is used in the same way as with the aforementioned threshold value Th2 and stored in the RAM 403. It is possible to provide a plurality of threshold values Th3 instead of one in the same way as with the aforementioned threshold value Th2. If this occurs, it is desirable to provide quantizing steps and space frequencies whose number is larger than the number of set threshold values by one as the parameter table 525 respectively.

The DCT process 503 executed by the DSP 402 executes the two-dimensional DCT process for the difference blocks 515 generated by the motion compensation prediction 502 in the same way as with the first embodiment and obtains DCT coefficients corresponding to space frequencies equal to the upper frequency F1 or F2 or less which are selected by the image attribute estimation process 600. Next, a quantization process 505 executed by the DSP 402 obtains a quantization coefficient by dividing DCT coefficients corresponding to space frequencies which are equal to the upper limit frequency F1 or F2 or less selected by the image attribute estimation process 600 among the DCT coefficients by a value obtained by multiplying the corresponding components of the quantization matrix 517 by the quantizing step Q1 or Q2 obtained by the image attribute estimation process 600 and obtains a quantization coefficient by setting DCT coefficients corresponding to space frequencies more than the upper limit frequency F1 or F2 to zero practically. Next, the variable length coding process 506 executed by the DSP 402 transforms only quantization coefficients which are selected by the image attribute estimation process 600 and correspond to space frequencies which are equal to the upper limit frequency F1 or F2 or less among the quantization coefficients to variable length codes. Next, the code outputting process 507 executed by the DSP 402 adds the control information 522 used for decoding and others to the variable length codes obtained by the variable length coding process 506, the quantizing step Q1 or Q2 selected by the image attribute estimation process 600, and the motion vector 514 generated by the motion compensation prediction 502 so as to generate image code data 518 in the code outputting process 507 and stores the image code data 518 in the RAM 403.

The code size measurement process 508 measures the amount of image code data and obtains a measured value of code size. The procedure of the code size judgment process 509 is as described above as shown in FIG. 10. The inverse quantization process 510, the inverse DCT process 511, and the decoded image data generation 512 are performed in the same way as with the first embodiment.

As mentioned above, according to the second embodiment, in the same way as with the first embodiment, the image CODEC 301 in the TV conference device 30a receives the required code size (required value of code size) from the opposite terminal 30d, selects a suitable combination of quantizing steps Q1 and Q2 and upper limit frequencies F1 and F2 from the parameter table 525 which is prepared beforehand according to an error between the required code size and the measured value of code size which is obtained by measuring decoded image data by the code size measurement process 508, obtains the image code data 518 which can express a sudden gradation change for an image including a sudden gradation change by increasing the upper limit frequency under the condition of image coding in a code size close to the required code size of the opposite terminal 30d by setting a quantizing step and an upper limit frequency from a combination of the selected quantizing steps Q1 and Q2 and upper limit frequencies F1 and F2 on the basis of the different image data 610 with respect to the content of an image in each area on the screen comprising one or a plurality of macro blocks in the image attribute estimation process 600, and obtains the image code data 518 having little occurrence of a block strain or a false outline by finely quantizing an image having little gradation change, and the CPU 304 can transmit the image code data 518 to the opposite terminal 30d via the communication network 314, and as a result, a TV conference device based on the international standard of image coding can be realized.

Therefore, in either of the first embodiment and the second embodiment, a TV conference device which can transmit image code data which can express a sudden gradation change and has little occurrence of a block strain or a false outline under the condition of image coding in a code size close to the required code size of an opposite terminal and conforms to the international standard to the opposite terminal can be realized.

In the aforementioned embodiments, cases that the present invention is applied to a TV conference device and a system thereof are explained. However, needless to say, the present invention can be applied to a TV telephone apparatus and a system thereof and a video mail apparatus and a system thereof.

According to the present invention, the moving picture encoder realizes an effect that image code data that can express a sudden gradation change for a moving picture including a sudden gradation change by increasing the upper limit frequency and can suppress an occurrence of a block strain or a false outline for a moving picture having little gradation change by finely quantizing it at the same time under the condition of image coding in a code size close to the required code size can be obtained on the basis of the international standard.

According to the present invention, the moving picture encoder realizes an effect that image code data that can express a sudden gradation change for a moving picture including a sudden gradation change by increasing the upper limit frequency and can suppress an occurrence of a block strain or a false outline for a moving picture having little gradation change by finely quantizing it at the same time under the condition of image coding in a code size close to the required code size of an opposite terminal can be obtained in conformity with the international standard and as a result, this image code data can be transmitted to the opposite terminal and a superior TV conference system can be realized.

The invention claimed is:

1. An image coding system in a system including an image inputting means, an image coding means for calculating orthogonal transform coefficients of the inputted image, and an image code transmitting means, comprising:

previously defined parameter information, arranged in a table, having a plurality of combinations of quantizing step values and upper limit values of image space frequencies in correspondence with an image code size;

means for deciding one combination from said parameter information on the basis of a size of an image code of the inputted image coded by said image coding means; and quantizing means for quantizing the orthogonal transform coefficients for space frequencies below said upper limit values of image space frequencies of the decided combination, on the basis of the quantizing step value of said decided combination, while executing no quantization for space frequencies higher than said upper limit values of image space frequencies of said decided combination.

2. An image coding system according to claim 1, wherein said deciding means further decides a combination from said parameter information according to an output image and a required code size decided by restrictions of said image coding system.

3. An image coding system according to claim 2, wherein said parameter information is a parameter table having at least an axis of a difference between a required code size and the coded image code size.

4. An image coding system according to claim 1, further comprising:

means for executing a motion compensation prediction and generating a difference block, for image data inputted from said image inputting means, obtaining an orthogonal transform coefficient by executing an orthogonal transform for the generated difference block;

means for obtaining a quantization coefficient by said quantizing means on the basis of said orthogonal transform coefficient;

means for transforming said quantization coefficient to a variable length code; and means for generating image code data by adding control information necessary for decoding said variable length code and said quantizing step value in said decided combination.

5. An image coding system according to claim 1, further comprising:

means for executing a motion compensation prediction and generating a difference block, for image data inputted from said image inputting means, obtaining an orthogonal transform coefficient by executing an orthogonal transform for the generated difference block;

wherein said deciding means further decides a combination from said parameter information according to an output image of an opposite terminal and a required code size decided by restrictions of the image coding system.

6. A TV conference system in a system including an image inputting means, an image coding means for calculating orthogonal transform coefficients of the inputted image, and an image code transmitting means, comprising:

previously defined parameter information, stored in a table, having a plurality of combinations of quantizing step values and upper limit values of image space frequencies in correspondence with an image code size;

means for executing a motion compensation prediction and generating a difference block, for image data inputted from said image inputting means, obtaining an orthogonal transform coefficient by executing an orthogonal transform for the generated difference block;

means for deciding one combination from said parameter information on the basis of a size of an image code of the inputted image coded by said orthogonal transform coefficient; and quantizing means for quantizing the orthogonal transform coefficients for space frequencies below said upper limit values of image space frequencies of the decided combination, on the basis of the quantizing step value of said decided combination, while executing no quantization for space frequencies higher than said upper limit values of image space frequencies of said decided combination.

7. A TV conference device according to claim 6, further comprising:

means for decoding image code data transmitted from an opposite terminal;

means for obtaining a quantization coefficient by said quantizing means on the basis of said orthogonal transform coefficient;

means for transforming said quantization coefficient to a variable length code; and means for generating image code data by adding control information necessary for decoding said variable length code and said quantizing step value in said decided combination.

8. A moving picture coding system in a system including an image inputting means, an image coding means for calculating orthogonal transform coefficients of the inputted image, and an image code transmitting means, comprising:

previously defined parameter information, stored in a table, having a plurality of combinations of quantizing step values and upper limit values of image space frequencies in correspondence with an image code size;

means for executing a motion compensation prediction and generating a difference block, for image data inputted from said image inputting means, obtaining an orthogonal transform coefficient by executing an orthogonal transform for the generated difference block;

means for deciding a plurality of combinations from said parameter information on the basis of a size of an image code of the inputted image coded by said orthogonal transform coefficient;

means for estimating the image attributed on the basis of at least one of said difference block and orthogonal transform coefficient;

means for selecting a combination of a desired one quantizing step value and upper limit value of space frequency from said decided plurality of combinations in correspondence with said estimated image attribute; and quantizing means for quantizing the orthogonal transform coefficients, for space frequencies below said upper limit values of image space frequencies of the selected combination, on the basis of the quantizing step value of said selected combination, while executing no quantization for space frequencies higher than said upper limit values of image space frequencies of said selected combination.

9. A moving picture coding system according to claim 8, further comprising:

means for obtaining a quantization coefficient by said quantizing means on the basis of said orthogonal transform coefficient;

means for transforming said quantization coefficient to a variable length code; and means for generating image code data by adding control information necessary for decoding said variable length code and said quantizing step value in said selected combination.

10. A moving picture coding system according to claim 8, further comprising:

means for transmitting said image code data quantized by said quantizing means to an opposite terminal;

wherein said quantizing means comprises:

means for transforming said orthogonal transform coefficient to be quantized to a variable length code; and means for generating image code data by adding control information necessary for decoding said variable length code and said quantizing step value in said selected combination.

11. A moving picture coding system according to claim 10, further comprising:

storage means for storing image code data transmitted from an opposite terminal;

means for transmitting image code data stored in said storage means to an opposite terminal; and means for decoding image code data which is transmitted from an opposite terminal and stored in said storage means and displaying it on display means.

12. A moving picture coding system in a system including an image inputting means, an image coding means for calculating orthogonal transform coefficients of the inputted image, a frame memory, and an image code transmitting means, comprising:

previously defined parameter information, stored in a table, having a plurality of combinations of quantizing step values and upper limit values of image space frequencies in correspondence with an image code size;

means for dividing inputted image data into blocks of n pixels×n pixels, integrating a plurality of said blocks, and generating macro blocks;

means for generating a motion vector for each of said macro blocks by performing operations between said macro blocks and image data stored in said frame memory;

means for executing motion compensation prediction by generating a difference block for each of said divided blocks;

means for obtaining an orthogonal transform coefficient by executing orthogonal transform for said difference blocks;

means for deciding at least one combination from said parameter information on the basis of said image code size of the inputted image coded by said coding means;

means for estimating the image attribute on the basis of at least one of said difference block and said orthogonal transform coefficient;

means for selecting a combination of a desired one quantizing step value and a desired upper limit value of space frequency from said decided at least one combination in correspondence with said estimated image attribute; and quantizing means for quantizing the orthogonal transform coefficients for space frequencies below said upper limit values of image space frequencies of the selected combination, on the basis of the quantizing step value of said selected combination, while executing no quantization for space frequencies higher than said upper limit values of image space frequencies of said selected combination.

13. A moving picture coding system according to claim 12, wherein at least one combination decided by said deciding means is a plurality of candidate combinations and said image attribute estimated by said estimation means including at least one of an image having a sudden gradation change and an image having little gradation change.

14. A moving picture coding system according to claim 13, further comprising:

means for selecting a step of a large value from candidate values of a plurality of quantizing step values for said desired quantizing step value and selecting an upper limit value of a large value from candidate values of a plurality of upper limit values of space frequencies to be coded for said desired upper limit value of space frequency when said image attribute estimated by said estimation means is estimated as an image including a sudden gradation change; and means for selecting a small step value from candidate values of a plurality of quantizing step values for said desired quantizing step value and selecting an upper limit value of a small value from candidate values of a plurality of upper limit values of space frequencies to be coded for said desired upper limit value of space frequency when said image attribute estimated by said estimation means is estimated as an image having little gradation change.

15. A moving picture coding system according to claim 12, wherein said parameter information comprises at least one of a predetermined function and a parameter table which are decided on the basis of a plurality of moving pictures having different gradation changing degrees.

16. A moving picture coding system according to claim 12, further comprising:

means for autonomously detecting a processing capacity and processing load of a terminal having at least one of a load of a network and a moving picture encoder, wherein said deciding means decides said at least one combination on the basis of said autonomously detected processing capacity and processing load.

17. A moving picture coding system according to claim 12, wherein said deciding means decides on the basis of the processing capacity and a required value of code size of an opposite terminal executing image communication.

18. A moving picture coding system according to claim 12, wherein said deciding means further decides a required code size given by an instruction inputted from the outside of said moving picture coding system.

19. An image coding method in a system including an image inputting means, an image coding means, and an image code transmitting means, comprising:

a step of obtaining previously defined parameter information having a plurality of combinations of quantizing steps and upper limit values of image space frequencies in accordance with an image code size, the parameter information being stored in a table;

a step of deciding one combination from said parameter information on the basis of a size of an image code of the inputted image coded by said image coding means; and a quantizing step of quantizing the orthogonal transform coefficients for space frequencies below said upper limit values of image space frequencies of the decided combination, on the basis of the quantizing step value of said decided combination, while executing no quantization for space frequencies higher than said upper limit values of image space frequencies of said decided combination.

20. A method of TV conference in a system including an image inputting means, an image coding means, and an image code transmitting means, comprising:

a step of obtaining previously defined parameter information having a plurality of combinations of quantizing steps and upper limit values of image space frequencies depending on the image code size, the parameter information being stored in a table;

a step of executing a motion compensation prediction and generating a difference block, for image data inputted from said image inputting means, obtaining an orthogonal transform coefficient by executing orthogonal transform for the generated difference block;

a step of deciding one combination from said parameter information on the basis of a size of an image code of the inputted image coded by said orthogonal transform coefficient; and a quantizing step of quantizing the orthogonal transform coefficients for space frequencies below said upper limit values of image space frequencies of the decided combination, on the basis of the quantizing step value of said decided combination, while executing no quantization for space frequencies higher than said upper limit values of image space frequencies of said decided combination.

21. A moving picture coding method in a system including an image inputting means, an image coding means, and an image code transmitting means, comprising:

a step of obtaining previously defined parameter information having a plurality of combinations of quantizing steps and upper limit values of image space frequencies in accordance with an image code size, the parameter information being stored in a table;

a step of executing a motion compensation prediction and generating a difference block, for image data inputted from said image inputting means, obtaining an orthogonal transform coefficient by executing orthogonal transform for the generated difference block;

a step of deciding a plurality of combinations from said parameter information on the basis of a size of an image code of the inputted image coded by said orthogonal transform coefficient;

a step of estimating the image attributed on the basis of at least one of said difference block and orthogonal transform coefficient;

a step of selecting a combination of a desired one quantizing step value and upper limit value of space frequency from said decided plurality of combinations in correspondence with said estimated image attribute; and a quantizing step of quantizing the orthogonal transform coefficients for space frequencies below said upper limit values of image space frequencies of the selected combination, on the basis of the quantizing step value of said selected combination, while executing no quantization for space frequencies higher than said upper limit values of image space frequencies of said selected combination.

* * * * *